US005259530A

United States Patent [19]

Ishine et al.

[11] Patent Number: 5,259,530

[45] Date of Patent: Nov. 9, 1993

[54] AUTOMATIC VENDING MACHINE

[75] Inventors: Seizo Ishine, Kawasaki; Masato Tago, Yokohama; Kiyoshi Fujioka, Ootsu, all of Japan

[73] Assignee: Kabushiki Kaisha Toshiba, Kawasaki, Japan

[21] Appl. No.: 772,093

[22] Filed: Oct. 2, 1991

[30] Foreign Application Priority Data

Oct. 3, 1990 [JP] Japan ................................ 2-263862

[51] Int. Cl.$^{5}$ ............................................ B65G 59/00

[52] U.S. Cl. ...................................... 221/68; 221/124

[58] Field of Search ................ 221/93, 124, 126, 130, 221/176, 252, 272, 274, 276, 311, 68

[56] References Cited

U.S. PATENT DOCUMENTS 3,749,280 7/1973 Gale ...................................... 221/68

FOREIGN PATENT DOCUMENTS 1-069561 3/1989 Japan ...................................... 221/68

1069561 3/1989 Japan ...................................... 221/68

*Primary Examiner*—Robert P. Olszewski
*Assistant Examiner*—Kenneth Noland
*Attorney, Agent, or Firm*—Foley & Lardner

[57] ABSTRACT

An automatic vending machine for automatically vending commodities comprises at least one storage unit for storing the commodities, at least two discharge paths downwardly branched from the storage unit, for discharging the commodities, and a feed unit for opening and closing the two discharge paths alternately for feeding the commodities one by one from the storage unit.

4 Claims, 35 Drawing Sheets

SWITCHING WORK OF THICK AND THIN CANS, FOR NEWLY INSTALLING A VENDING MACHINE

SWITCHING WORK OF THICK AND THIN CANS, FOR CHANGING COMMODITIES TO BE VENDED

| |
|---|
| FIG.59a |
| FIG.59b |

AUTOMATIC VENDING MACHINE

BACKGROUND OF THE INVENTION

1. Field of the Invention

The present invention relates to an automatic vending machine for vending canned or bottled commodities, and particularly to an automatic vending machine that efficiently accommodates canned or bottled commodities.

2. Description of the Prior Art

An automatic vending machine usually incorporates a plurality of long vertical racks for horizontally storing commodities such as canned beverages. Each of the racks has an upper charging port for charging the commodities into the rack and a lower discharge path for discharging the commodities out of the rack. The discharge path has a feed mechanism for feeding the commodities such as canned beverages one by one.

Commodities of the same kind are dropped through the upper charging port of one of the racks one by one and stored therein in a single line. Namely, the storage capacity of the rack is determined by the vertical size of the rack.

To increase the storage capacity of the rack, the rack may be vertically extended. This, however, cannot be done freely because the vertical size is restricted by various conditions. The conventional rack structure of the automatic vending machine, therefore, is not efficient in accommodating a large quantity of commodities, and commodities which are popular are quickly sold out and must be frequently replenished. This requires great men-hours.

SUMMARY OF THE INVENTION

An object of the present invention is to provide an automatic vending machine having a greatly improved capacity of accommodating commodities.

Another object of the present invention is to provide an automatic vending machine that has a large storage capacity, discharges commodities out of racks with no clogging, and easily deals with canned commodities of large and small diameters.

In order to accomplish the objects, the invention provides an automatic vending machine comprising a plurality of storage racks each having a storage portion and first and second discharge paths downwardly branched from the storage portion. The discharge paths involve a feed unit having a pair of guide faces, and guide plates opposing the guide faces, respectively. On the side of the guide faces, a feed mechanism is arranged for opening and closing the first and second discharge paths alternately to feed the commodities one by one.

A pusher is arranged at an upper part of each of the first and second discharge paths. A free lower end of the pusher guides commodities toward the center of the first or the second discharge path. At least one of the pushers is provided with a subpusher having a spring force weaker than that of the pusher and a free end extending into the discharge path.

A guide member is arranged on the feed unit. The guide member has an angular cross section for guiding the commodities from the storage portion into the first and second discharge paths. The top of the guide member is shiftable toward one of the first and second discharge paths.

The guide plates that face the guide faces of the feed unit and form the first and second discharge paths are supported such that they are movable toward and away from the guide faces depending on the diameters of the canned or bottled commodities. The guide plates and the guide member disposed on the feed unit are interlocked with each other through an interlock mechanism so that the top of the guide member may be shifted between a neutral position and the first or the second discharge path in response to movements of the guide plates.

The automatic vending machine having such arrangement can store a large quantity of canned or bottled commodities in a plurality of the storage portions disposed in the vending machine.

A plurality of lines of commodities stored in the storage portions are diverged by the guide member having the angled cross section and smoothly guided into the first and second discharge paths. The commodities are then fed one by one by the feed mechanism.

At this time, the canned commodities may be pushed to one another in a diverging region of the guide member so that the pushing force may balance with the weight of the cans to clog the cans in a bridged state even if no supporting force acts from under the cans. This is called a bridge phenomenon. The present invention prevents this phenomenon by alternately dropping the canned commodities and causing, with the help of downwardly acting load, an imbalance to break the bridge phenomenon.

When the last row of commodities is to be fed from the storage portion, the subpusher pushes the commodities toward the center of the discharge paths to cause an imbalance between them, so that the bridge phenomenon never occurs, and the last one of the canned commodities is surely fed.

The guide plates are moved toward or away from the guide faces to narrow or widen the widths of the first and second discharge paths, thereby dealing with commodities packed in thin or thick cans. The top of the guide member is correctly positioned between lines of the canned commodities to surely branch and guide the commodities stored in a plurality of lines in the storage portions into the first and second discharge paths.

These and other objects, features and advantages of the present invention will be more apparent from the following detailed description of preferred embodiments in conjunction with the accompanying drawings.

DETAILED DESCRIPTION OF THE EMBODIMENTS

An embodiment of the present invention will be explained in detail with reference to FIGS. 1 through 59.

Figure 1:
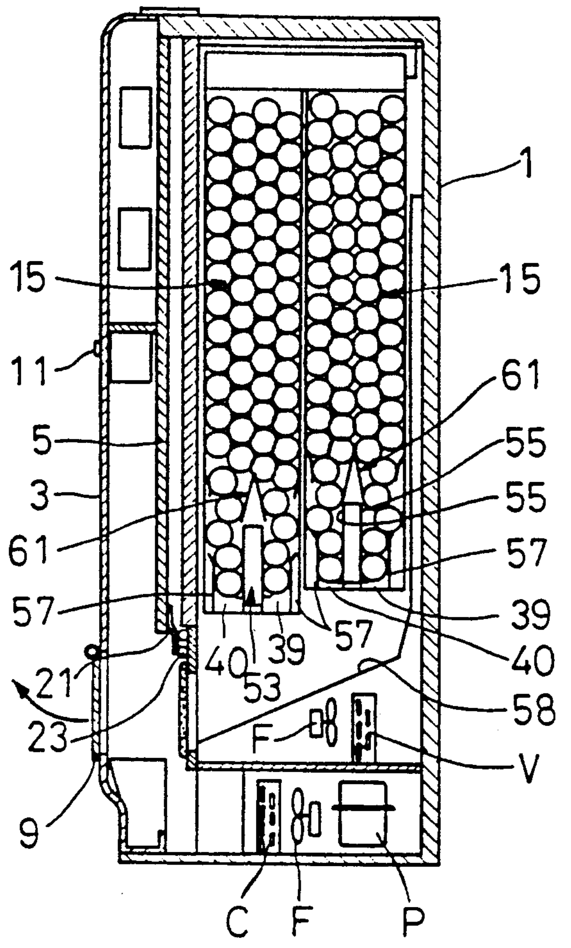
FIG. 1 is a sectional view schematically showing an automatic vending machine according to the present invention.
Figure 2:
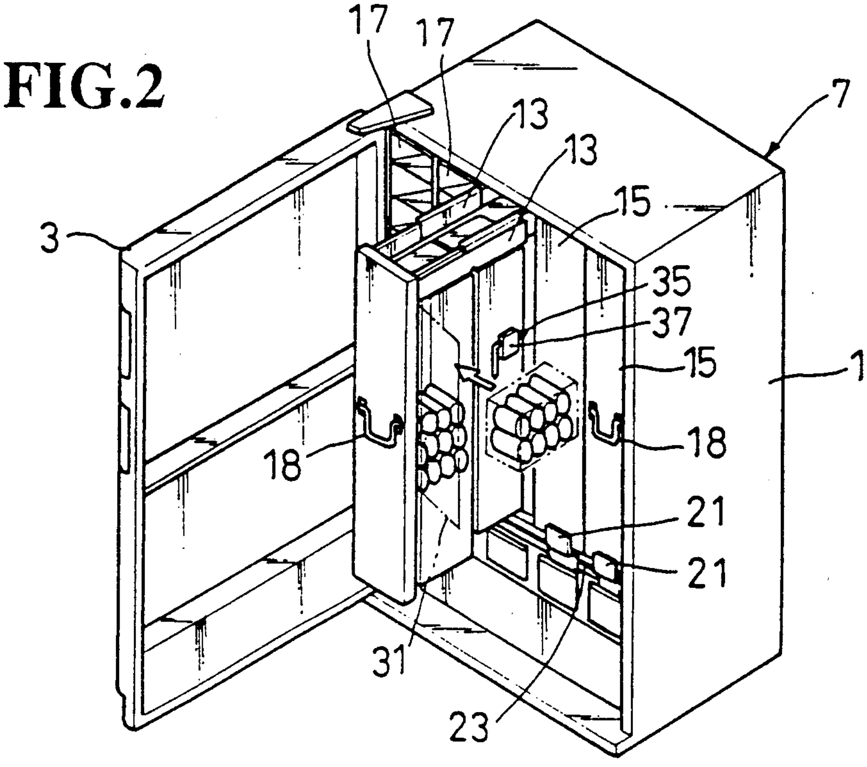
FIGS. 2 and 3 are perspective views showing the automatic vending machine.
Figure 3:
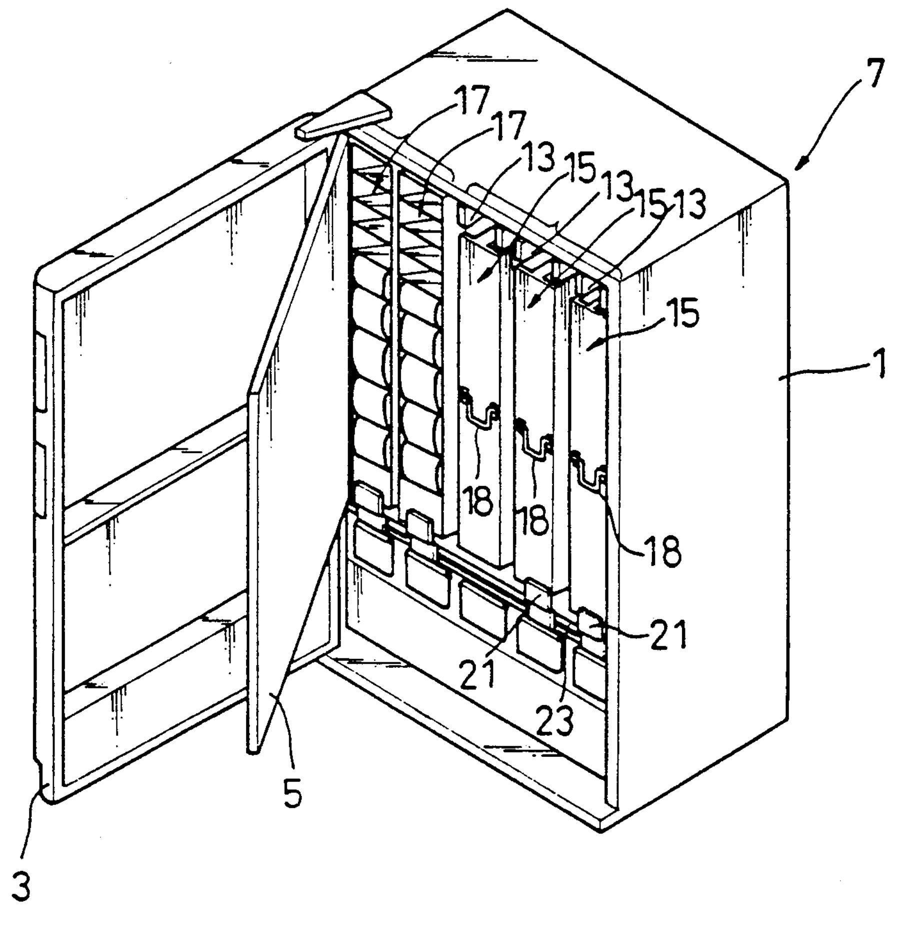

In FIGS. 1, 2 (not showing an inner door) and 3, a main body 1 of an automatic vending machine 7 comprises a main door 3 and the inner door 5. The main body 1 incorporates a freezer, which comprises an evaporator V, a compressor P, a condenser C and a fan F.

The main door 3 has a coin inlet (not shown), a delivery port 9, commodity selection buttons 11, a display portion for displaying samples of commodities, etc. The inner door 5 is made of insulation material.

The main body 1 incorporates storage racks 15 hanged from telescopic rails 13, and conventional serpentine storage racks 17. In the figures, two of the conventional storage racks are arranged on the left-hand side, and three of the storage racks according to the invention are arranged on the right-hand side.

The conventional storage racks 17 will not be explained any more because they are out of the scope of this invention.

Figure 6:
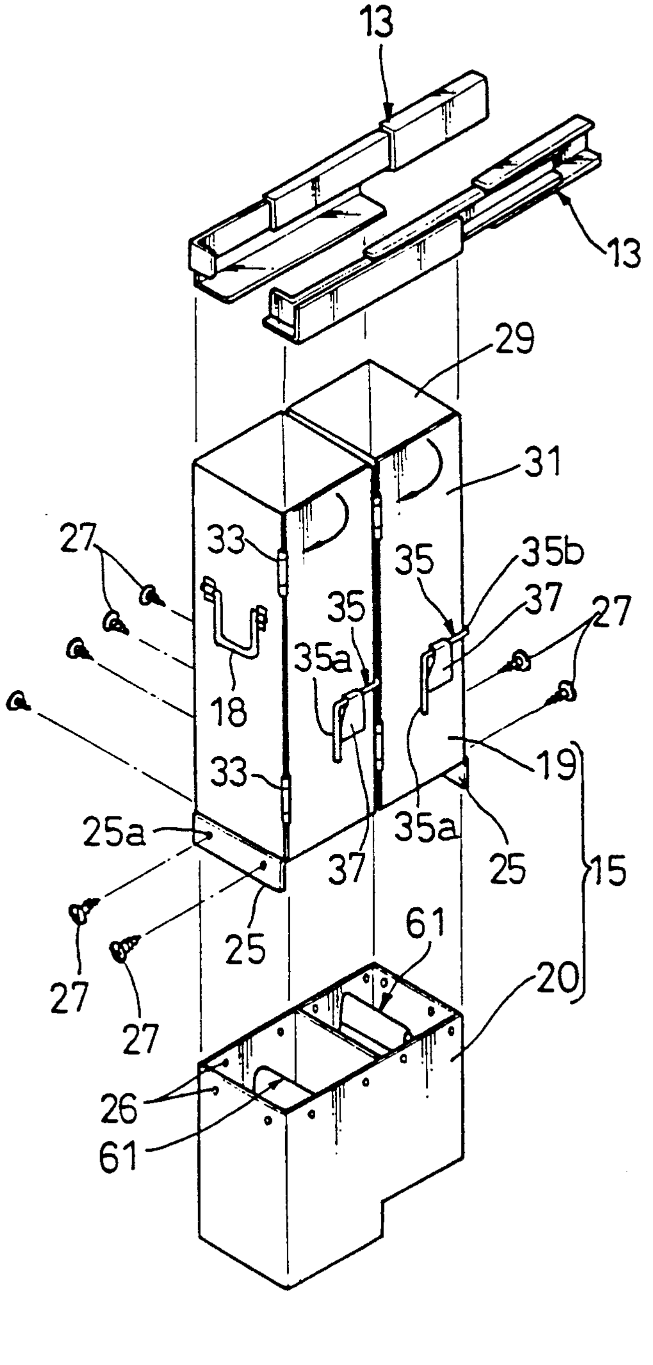
FIGS. 6 and 7 are exploded perspective views showing a storage rack of the automatic vending machine.

In FIG. 6, each of the storage racks 15 according to the present invention comprises upper storage portions 19 hanged from the telescopic rails 13 and a lower discharge portion 20. The storage and discharge portions 19 and 20 are removable from each other. With the telescopic rails 13, the storage rack 15 is movable back and forth.

Figure 4:
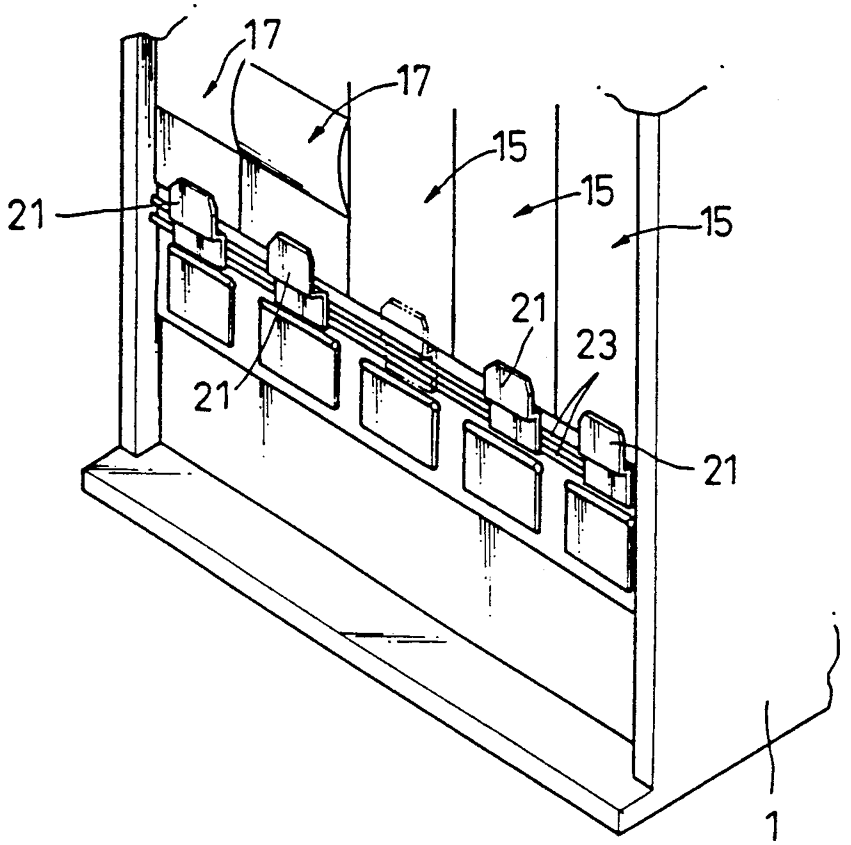
FIG. 4 is a perspective view showing an arrangement o stoppers of the automatic vending machine.
Figure 5:
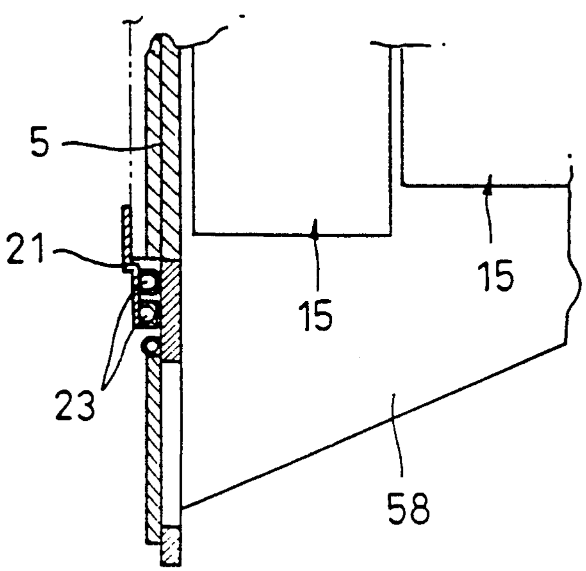
FIG. 5 is a sectional view showing the stopper.

In FIG. 4, stoppers 21 are arranged to allow only one of the storage racks 15 to be pulled out. The stoppers 21 are slid along a guide rail 23 so that an optional one of the storage racks 15 may be pulled out.

In FIG. 6, each of the storage portions 19 comprises a casing 29 having a square cross section and a door 31. A front wall of the casing 29 is provided with a handle 18 with which the storage rack 15 is pulled out. A lower edge of the casing 29 is provided with a bracket 25 having holes 25*a*, which are aligned with holes 26 formed on an upper edge of the discharge portion 20 and joined together with screws 27.

The door 31 is fitted to a side of the casing 29 with hinges 33 and turnable on a direction indicated with an arrow mark in FIG. 6. When the door 31 is widely opened, commodities may be collectively put in or taken out of the storage portion 19. The width of the casing 29 of the storage portion 19 is sized such that four lines of thin cans or three lines of thick cans are stored in the casing 29. The door 31 is locked or unlocked with a lock lever 35.

Figure 7:
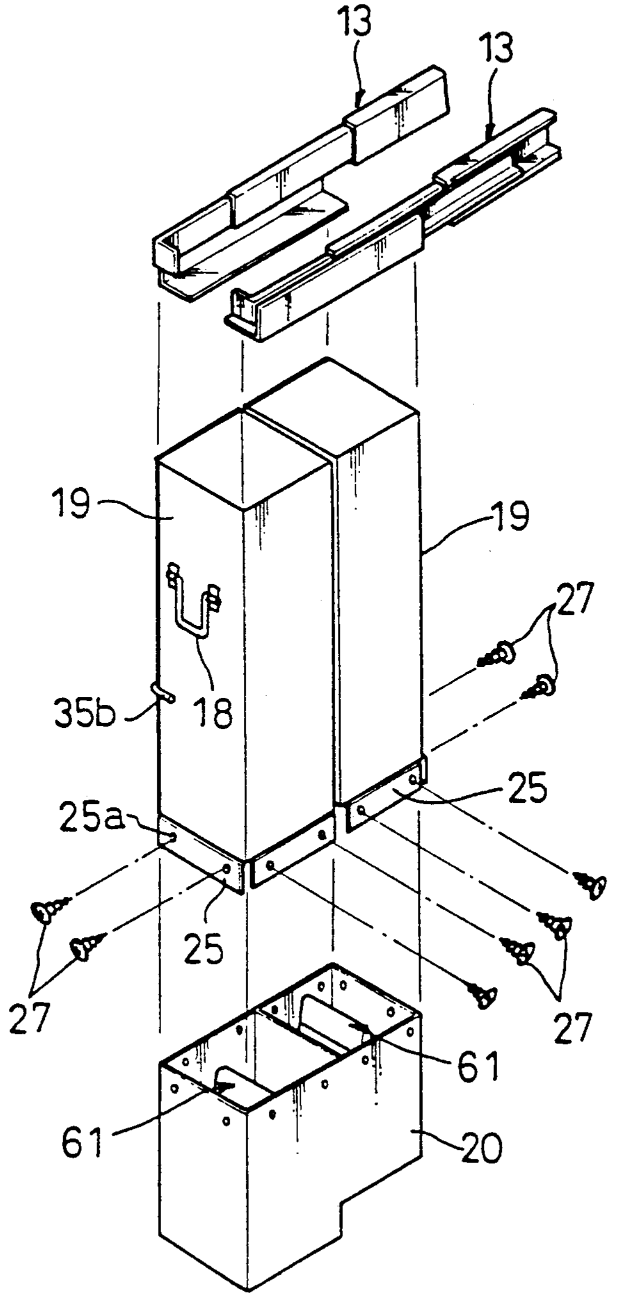

In FIG. 7, the casing 29 may be turned 180° degrees and fitted to the discharge portion 20, to secure a working space for replenishing the storage portion 19 with commodities. With this arrangement, the door 31 may freely be opened and closed even if the vending machine 7 is installed at a corner.

In FIGS. 8 to 12, the lock lever 35 of the door 31 is rotatably supported by a bracket 37. An end of the lock lever 35 is an operation portion 35*a* while the other end thereof is a stopping portion 35*b*. The operation portion 35*a* and stopping portion 35*b* are curved from each other by about 90° degrees so that, when the operation portion 35*a* is put in a locked state along the surface of the door 31, i.e., when the operation portion 35*a* is in contact with a stopper face 37*a* of the bracket 37, the stopping portion 35*b* is in a stopping state along a back face 29*a* of the casing 29.

Figure 8:
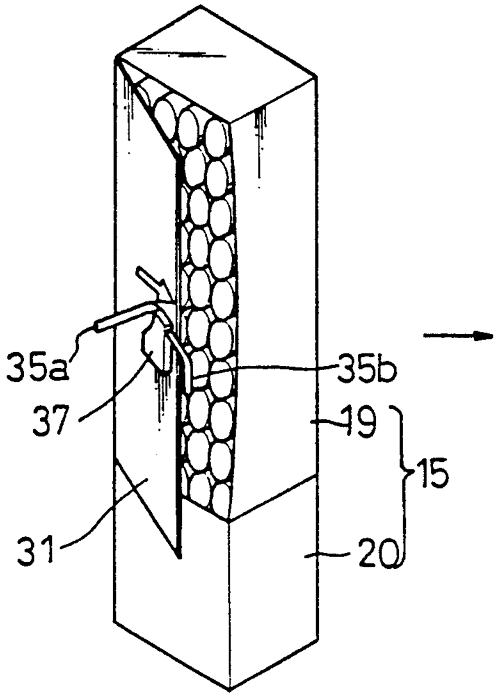
FIGS. 8 to 11 are views explaining operations of a lock lever of the storage rack.
Figure 9:
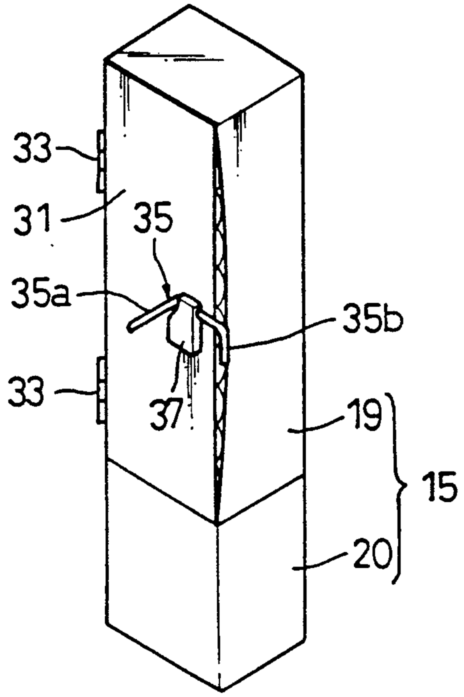
Figure 10:
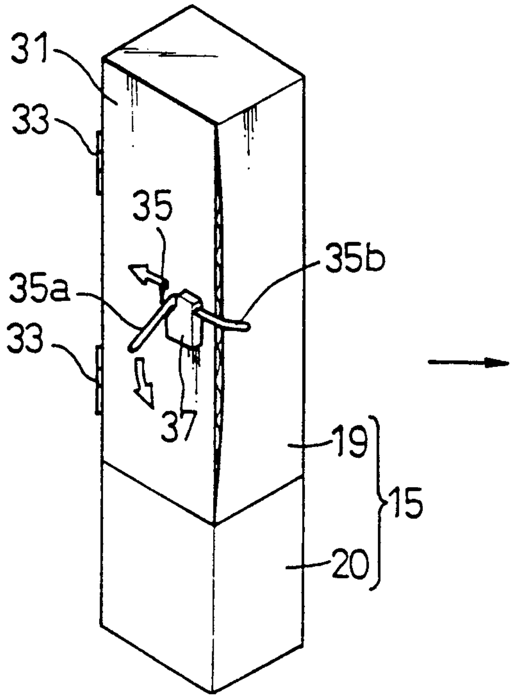
Figure 11:
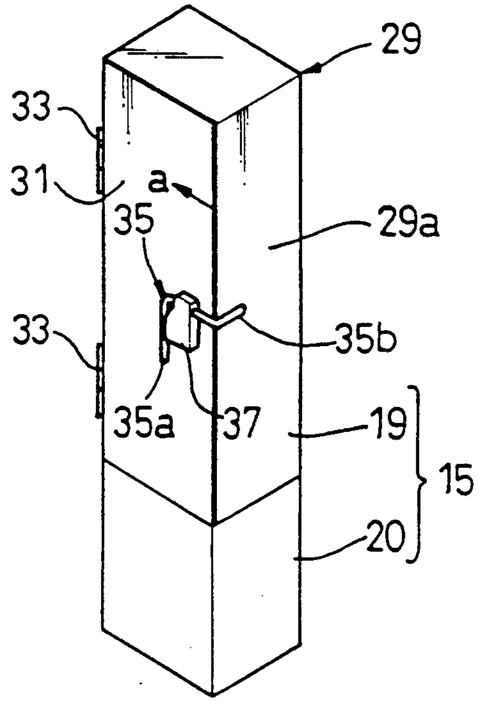
Figure 12:
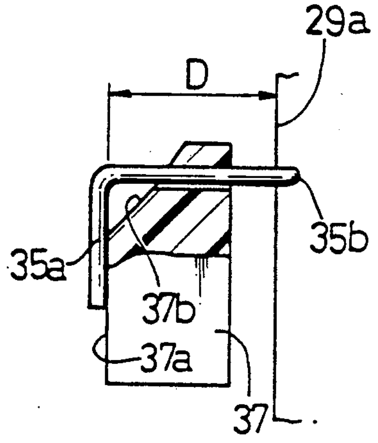
FIG. 12 is a view showing a structure for fitting the lock lever.
Figure 13:
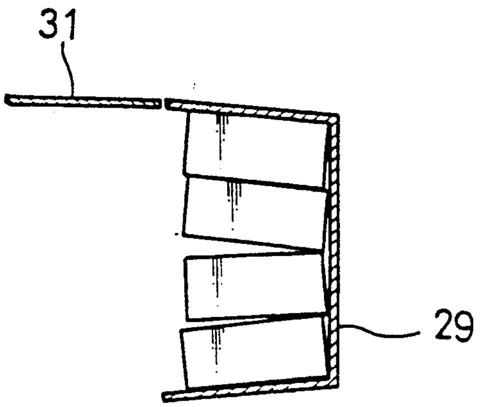
FIGS. 13 to 15 are views explaining a slipped state of commodities due to a bend of the storage rack.
Figure 14:
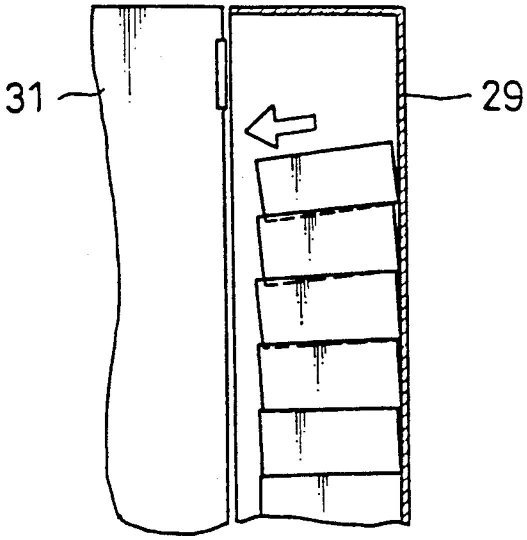
Figure 15:
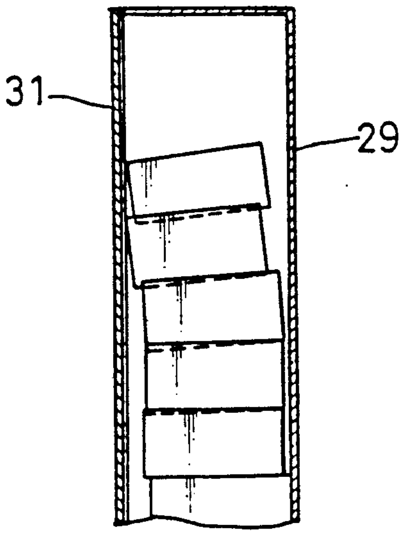

A distance D from the operation portion 35*a* to the stopping portion 35*b* is determined such that, when the operation portion 35*a* is slid on a tapered face 37*b* of the bracket 37 to get in contact with the stopper face 37*a* of the bracket 37, the back face 29*a* of the casing 29 is inwardly pushed as indicated with an arrow mark "a" in FIG. 11. This arrangement prevents a slippage of commodities inside the casing 29. Namely, when the storage portion 19 is fully filled with commodities as shown in FIGS. 8 and 9, the weight of the commodities may outwardly bend casing 29 as shown in FIGS. 13 and 14. The above arrangement prevents this kind of bend.

Figure 16:
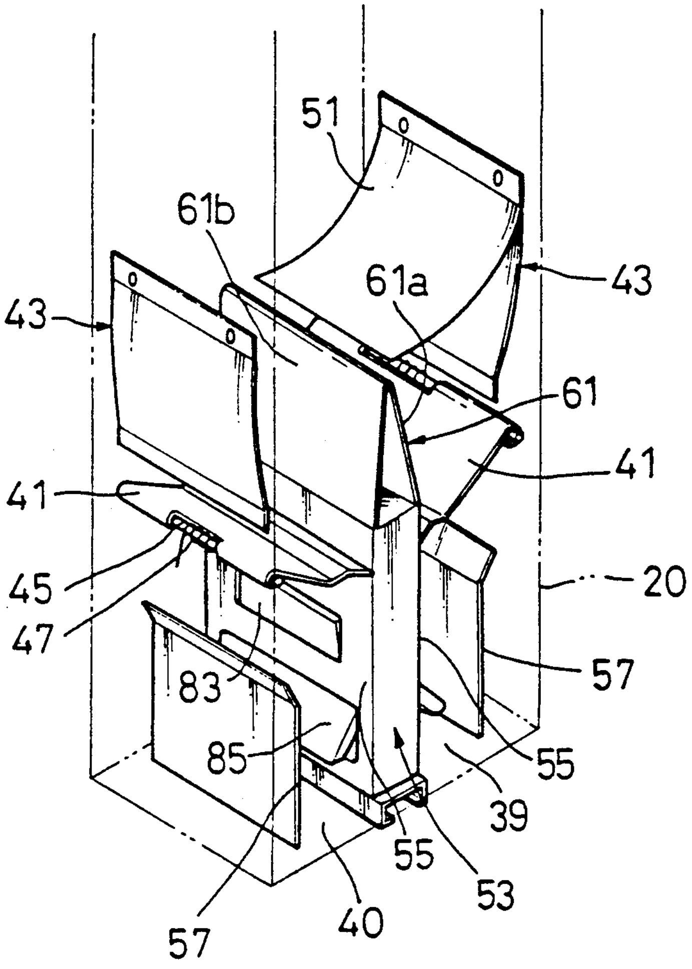
FIG. 16 is a perspective view showing an essential part of a discharge portion of the storage rack.

In FIG. 16, the discharge portion 20 involves first and second discharge paths 39 and 40, attitude control plates 41 disposed at upper parts of the discharge paths 39 and 40, respectively, and pushers 43 disposed above the attitude control plates 41, respectively.

Figure 17:
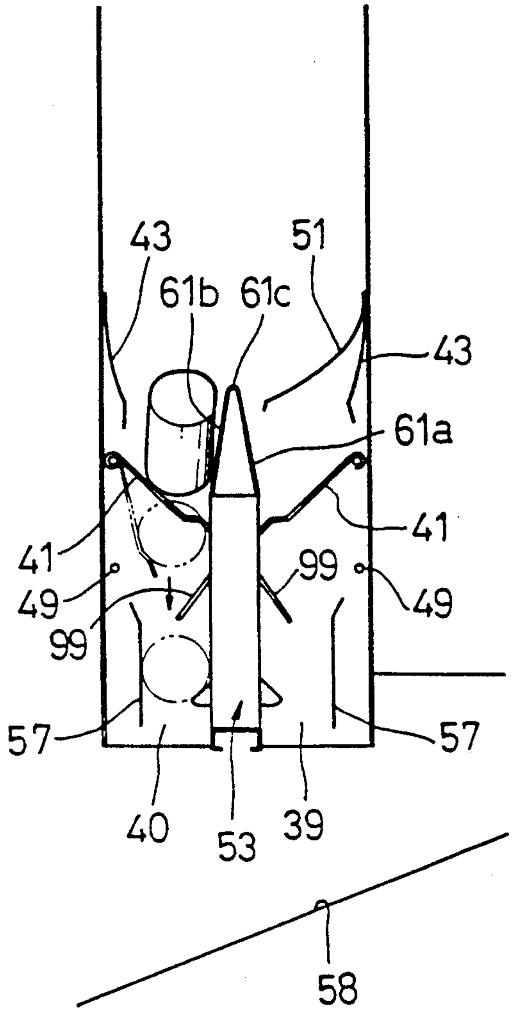
FIG. 17 is a view explaining an essential part of the discharge portion.
Figure 18:
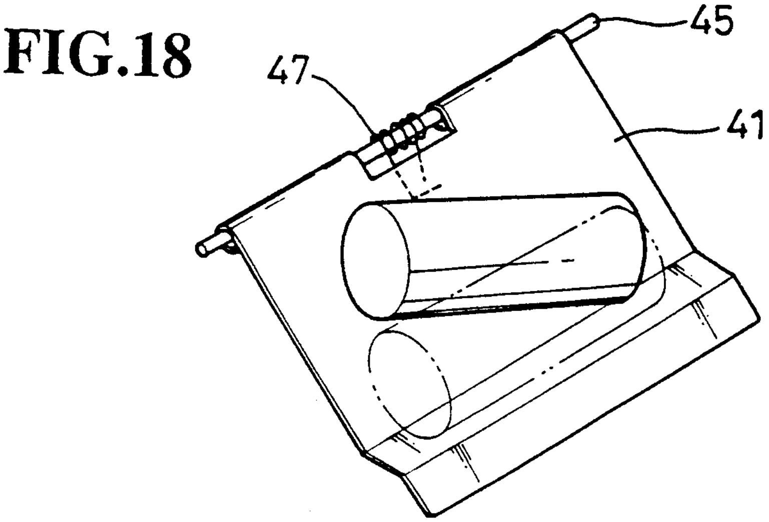
FIG. 18 is a perspective view showing an attitude control plate of the discharge portion.

Each of the attitude control plates 41 is swingable around a hinge shaft 45. A spring 47 disposed around the hinge shaft 45 pushes the attitude control plate 41 such that a free end thereof is inwardly oriented across a corresponding one of the first and second discharge paths 39 and 40. With this arrangement, an obliquely dropping commodity is substantially horizontally rearranged on the attitude control plate 41, as indicated with dotted lines in FIGS. 17 and 18.

Figure 25:
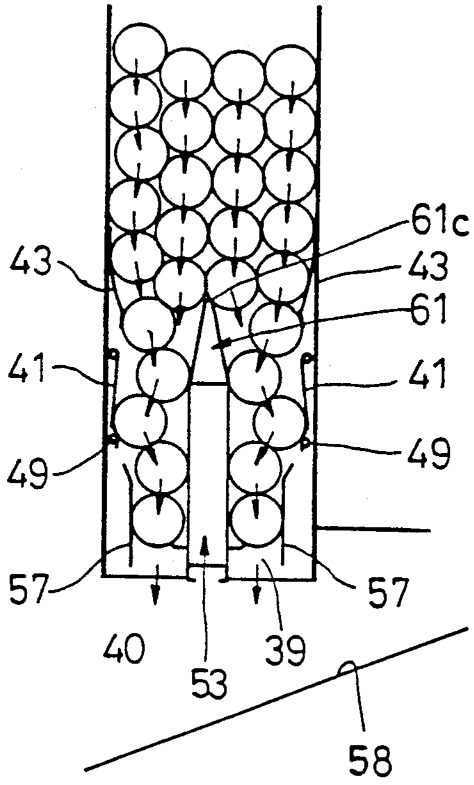
FIG. 25 is a view showing a position of the guide member for thin cans.

When the first and second discharge paths 39 and 40 are filled with commodities, the attitude control plates 41 are pushed against stoppers 49 by the commodities as shown in FIG. 25 so that the attitude control plates 41 may not block downward flows of the commodities.

Each of the pushers 43 is made of a plate spring. An upper end of the pusher 43 is fixed, and a lower end thereof is free to guide commodities toward the center of a corresponding one of the first and second discharge paths 39 and 40. A subpusher 51 is arranged on the pusher 43 in the first discharge path 39.

A spring force provided by the subpusher 51 is weaker than that provided by the pusher 43. An upper end of the subpusher 51 is joined with the upper end of the pusher 43, and a free end thereof extends toward a top 61*c* of a guide member 61 to be explained later. The subpusher 51 is pushed backward by commodities, and when commodities become nearly empty, protrudes forward.

Each of the first and second discharge paths 39 and 40 comprises a guide face 55 of a feed unit 53 and a guide plate 57 opposing the guide face 55. A chute 58 for transporting a commodity to the delivery port 9 is formed under the discharge paths 39 and 40.

The guide plate 57 of each of the first and second discharge paths 39 and 40 may be omitted, and instead, an inner wall of the discharge portion 20 may be used to form a guide having an optimum width for guiding commodities.

The feed unit 5 has a pair of feed mechanisms 59 and the guide member 61.

In FIGS. 20 through 24, the guide member 61 has an angular cross section having guide faces 61*a* and 61*b* for guiding commodities from the storage portions 19 into the first and second discharge paths 39 and 40. The guide member 61 is interlocked with the guide plates 57 through an interlock mechanism 63.

The top 61*c* of the guide member 61 is movable, around a support shaft 65 disposed at a base of the guide face 61*a*, from a neutral position I to a displaced position II. Each of the left and right guide plates 57 is supported by upper and lower plate shafts 67. Both ends of each of the upper and lower plate shafts 67 are able to slide in horizontal long holes 66 formed on the peripheral wall of the discharge portion 20, as indicated with arrow marks in FIG. 21.

A manual operation portion 69 is formed at an end of the left lower plate shaft 67, which protrudes from the peripheral wall of the discharge portion 20. The manual operation portion 69 has a positioning pin 71 that is usually pushed forward by a spring 70 as indicated with an arrow mark in FIG. 22.

The positioning pin 71 may be manually pulled backward against the spring 70 and then inserted into one of first and second holes 73 and 74 formed on the peripheral wall of the discharge portion 20. When the positioning pin 71 is inserted into one of the first and second holes 73 and 74, the guide plates 57 may move toward or away from the guide faces 55, thereby controlling the widths of the first and second discharge paths 39 and 40. The first hole 73 is used for thin cans, and the second hole 74 for thick cans.

The left guide plate 57 is integral with a lower rack 72 that engages with a pinion gear 68, while the right guide plate 57 is integral with an upper rack 75 also engaging with the pinion gear 68. When the left guide plate 57 is moved forward of backward through the manual operation portion 69, the upper rack 75 is moved accordingly through the pinion gear 68 to move the right guide plate 57 forward or backward relative to the corresponding guide face 55.

An extension 75*a* upwardly extending from the upper rack 75 is connected to the top 61*c* of the guide member 61 through a connection pin 77. Accordingly, when the guide plates 57 are moved forward or backward, the guide member 61 may be moved between the neutral position I and the rightwardly inclined position II.

Figure 23:
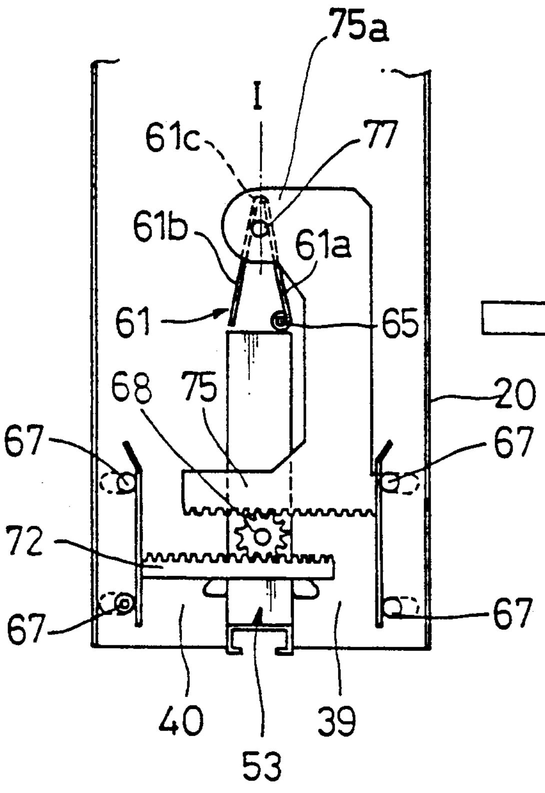
FIGS. 23 and 24 are views showing operations of the guide member and guide plates.
Figure 24:
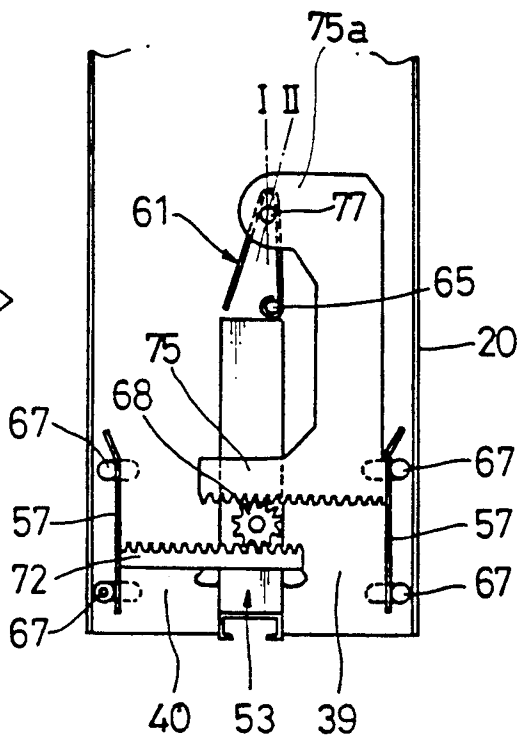

In FIGS. 23 and 24, the top 61*c* of the guide member 61 is set to the neutral position I when the first and second discharge paths 39 and 40 are used for thin cans, and to the displaced position II when the paths 39 and 40 are used for thick cans.

Figure 26:
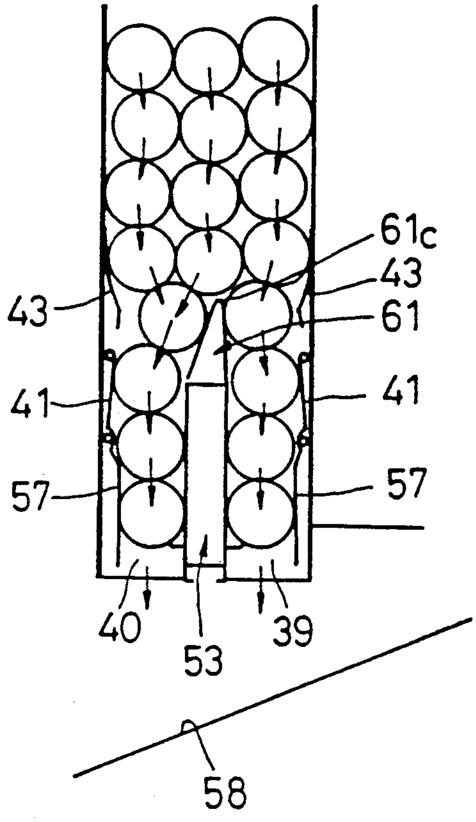
FIG. 26 is a view showing a position of the guide member for thick cans.

Namely, the top 61*c* of the guide member 61 is located between the second and third lines of cans when there are four lines of thin cans as shown in FIG. 25, and between the first and second lines when there are three lines of thick cans as shown in FIG. 26. With this arrangement, the thin or thick cans are correctly guided into the first and second discharge paths 39 and 40.

Figure 27:
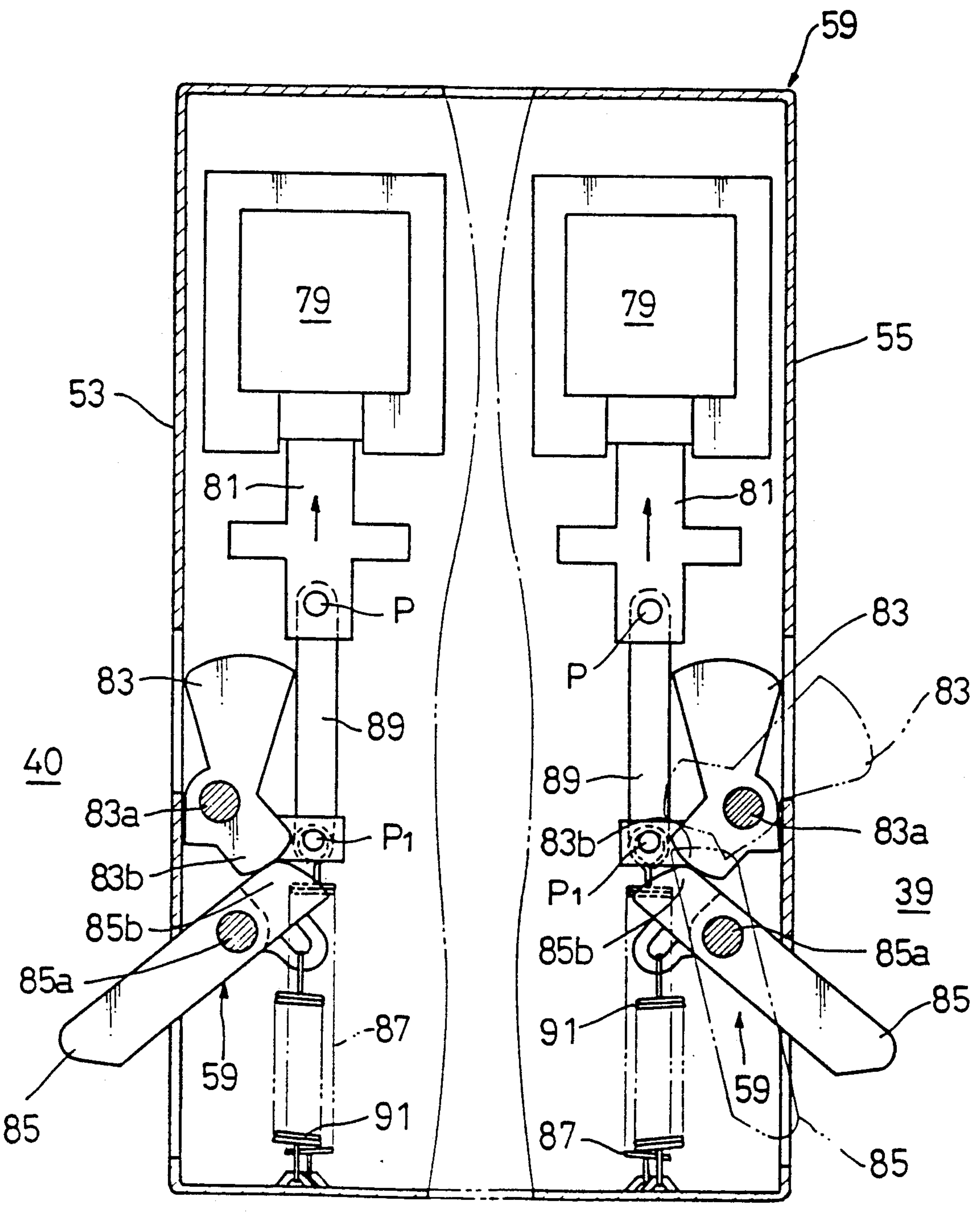
FIG. 27 is a sectional view showing a feed mechanism for feeding commodities.
Figure 28:
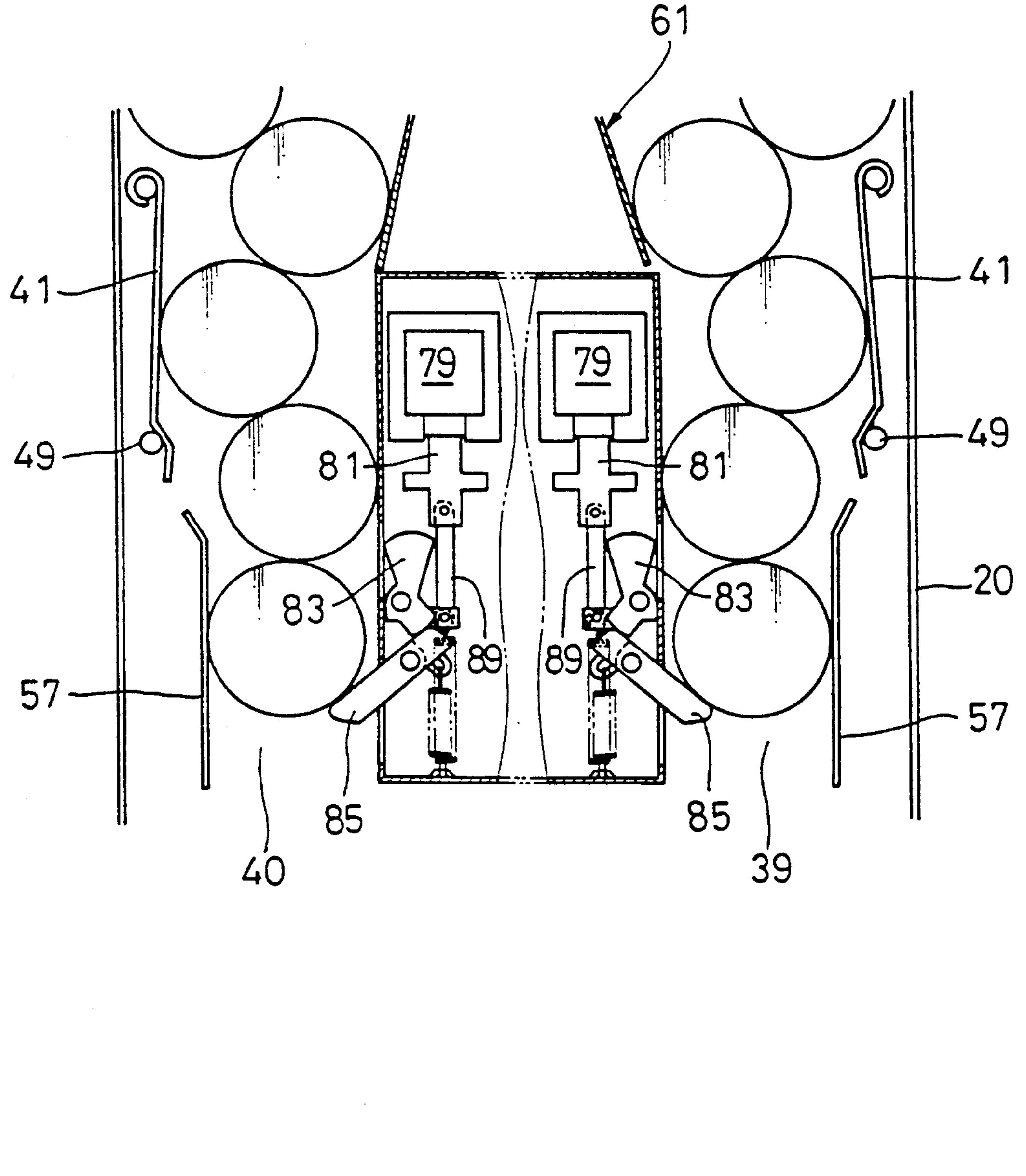
FIGS. 28 to 35 are views explaining operations of the feed mechanism.
Figure 29:
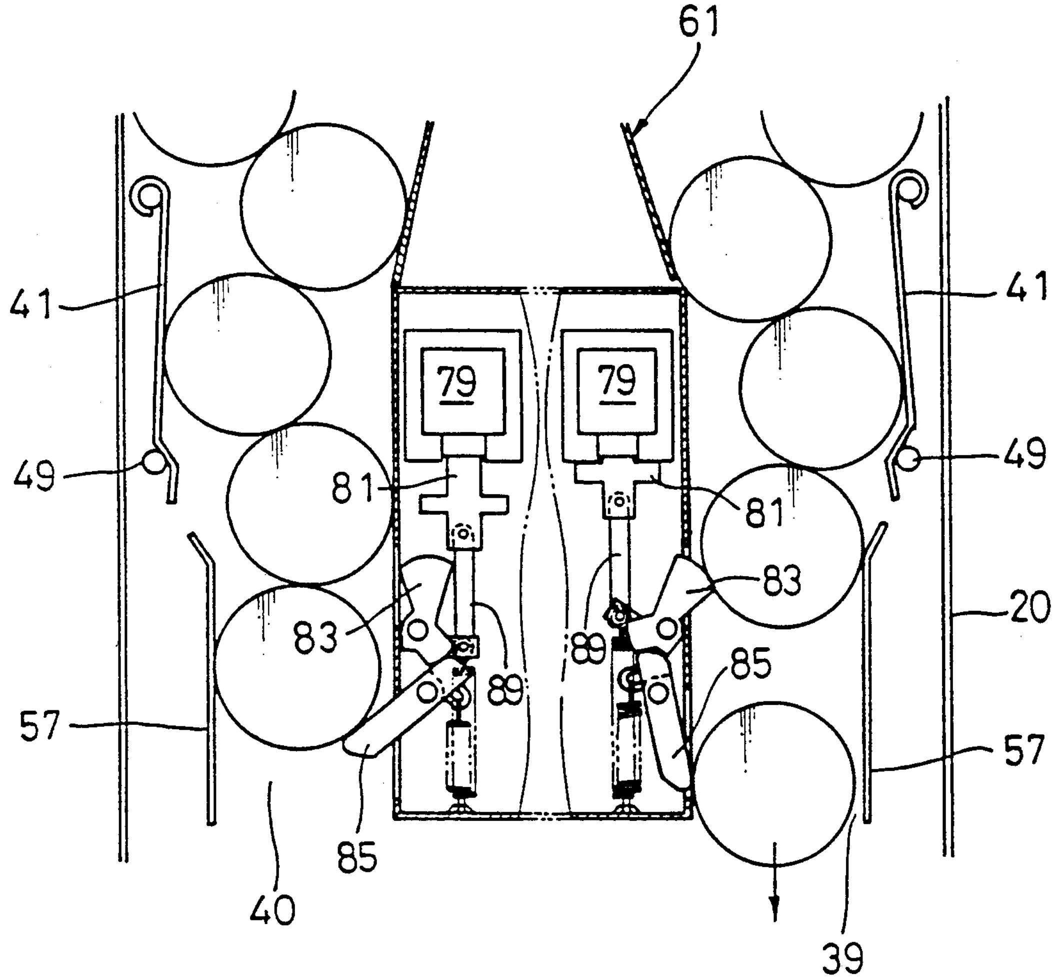
Figure 30:
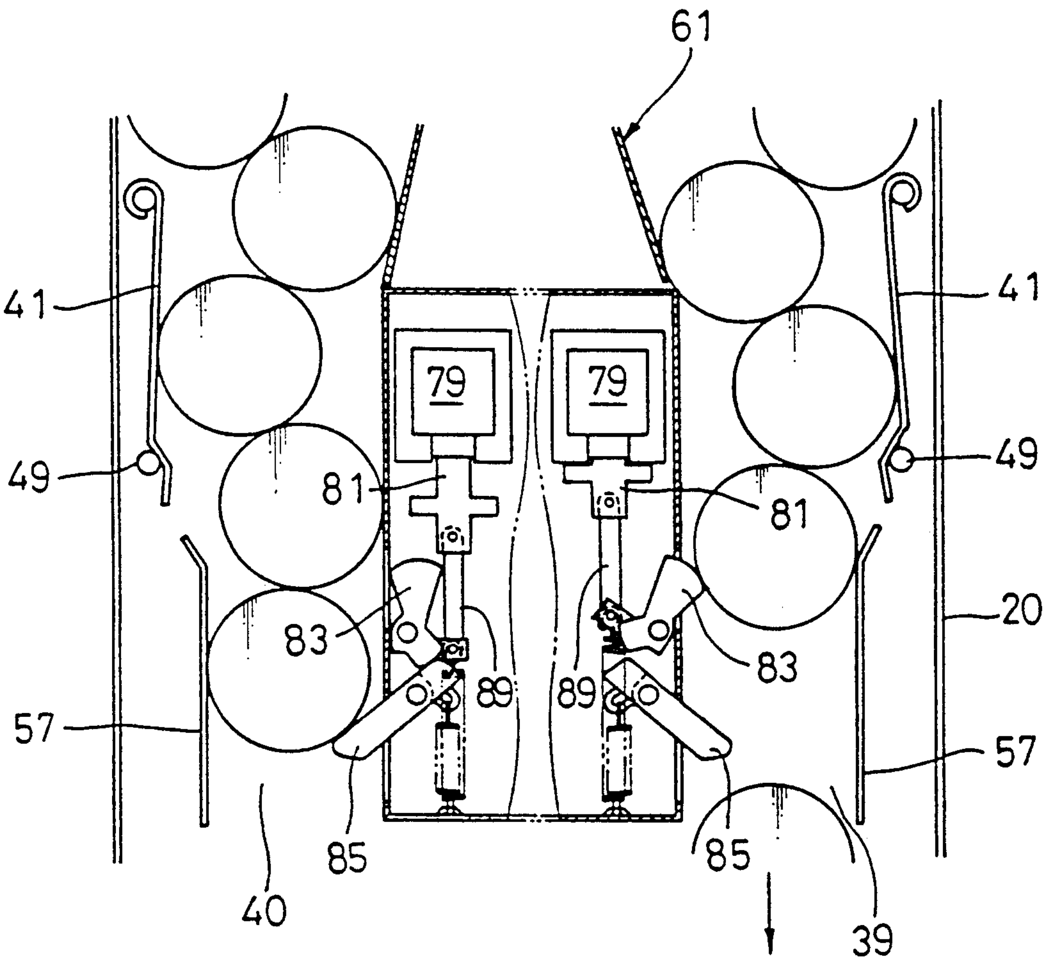
Figure 31:
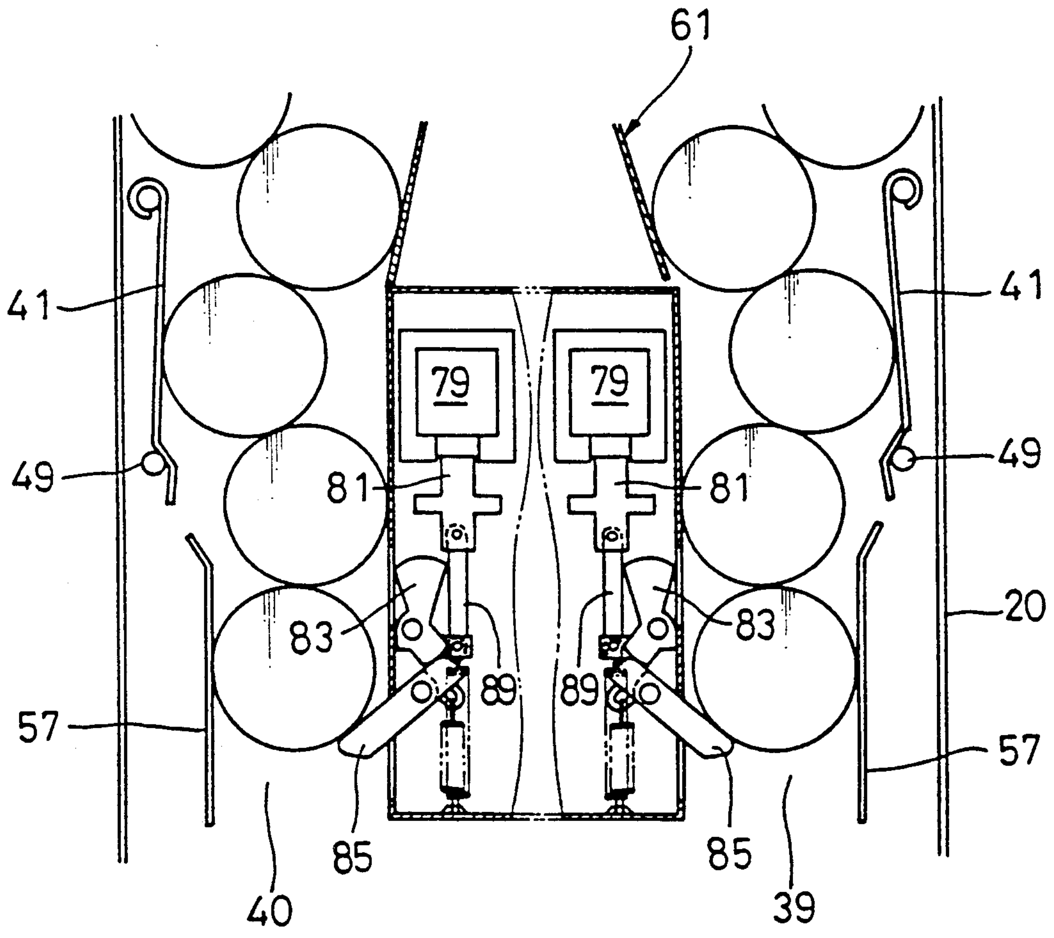
Figure 32:
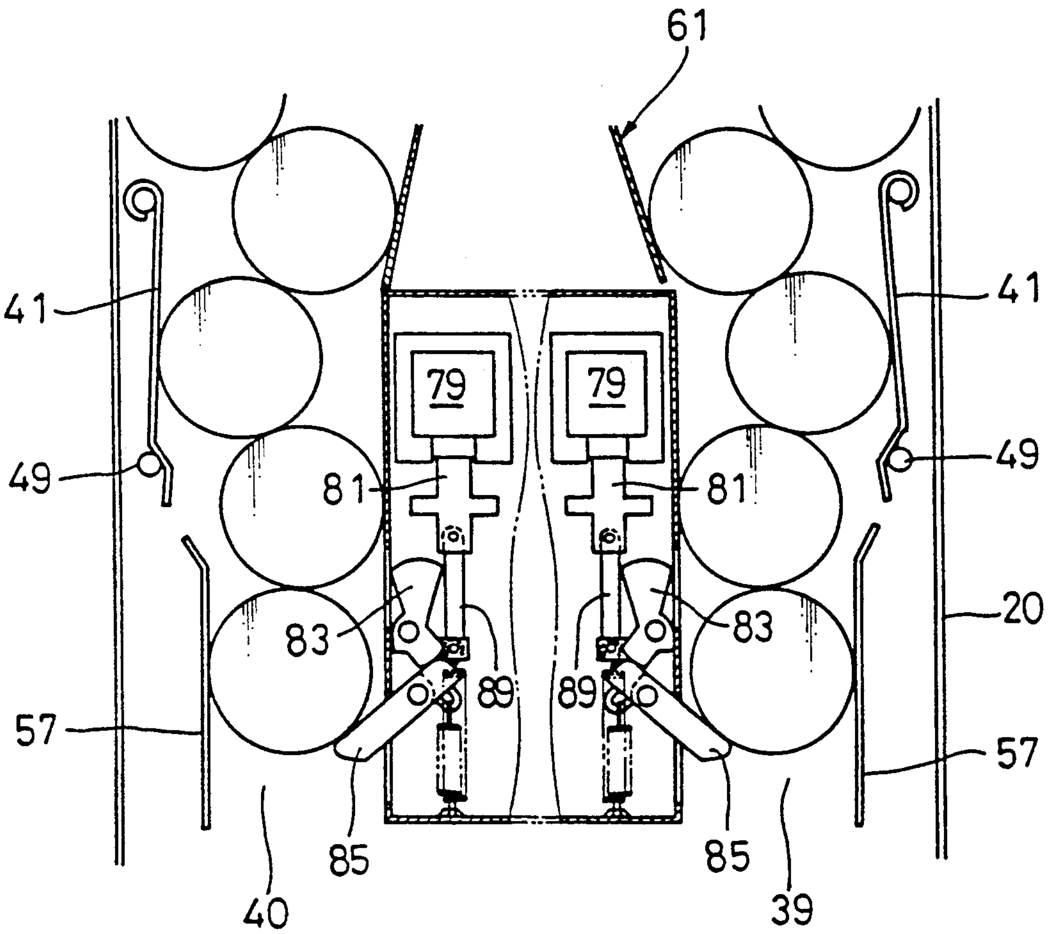
Figure 33:
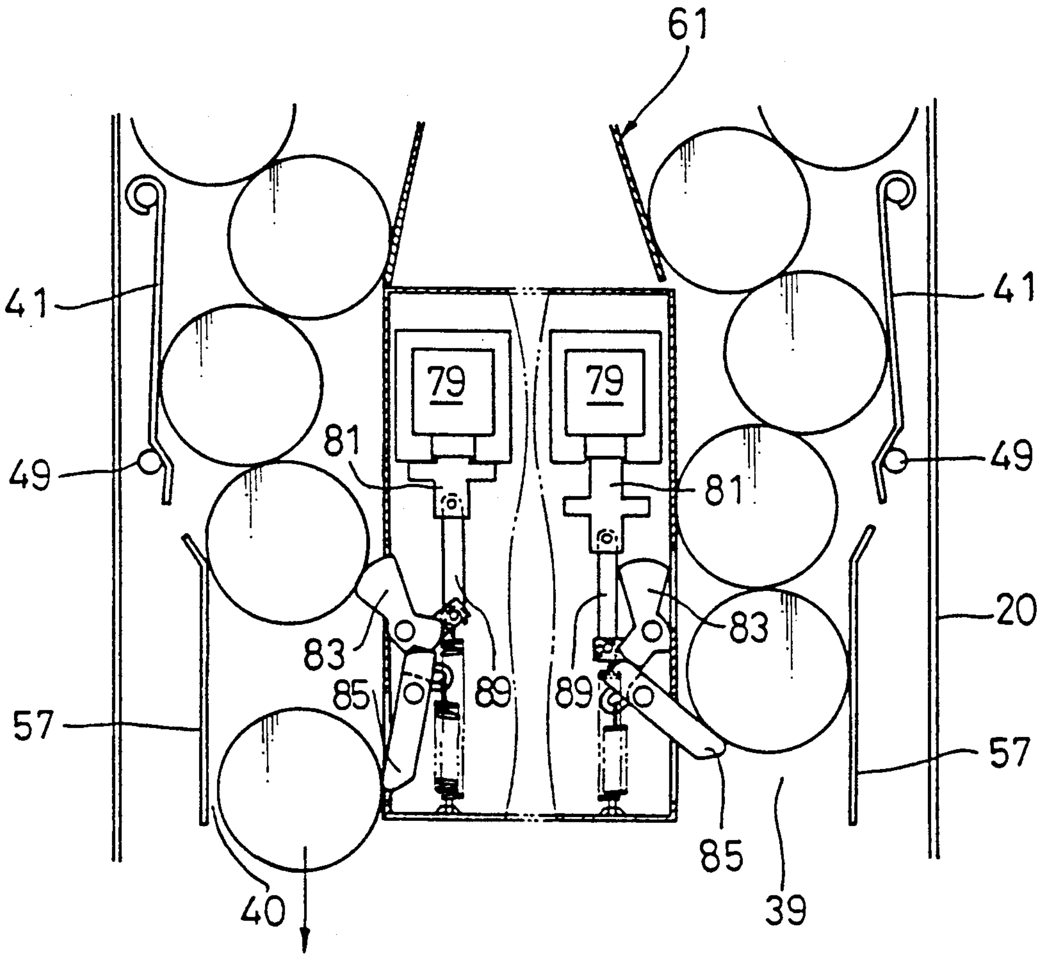
Figure 34:
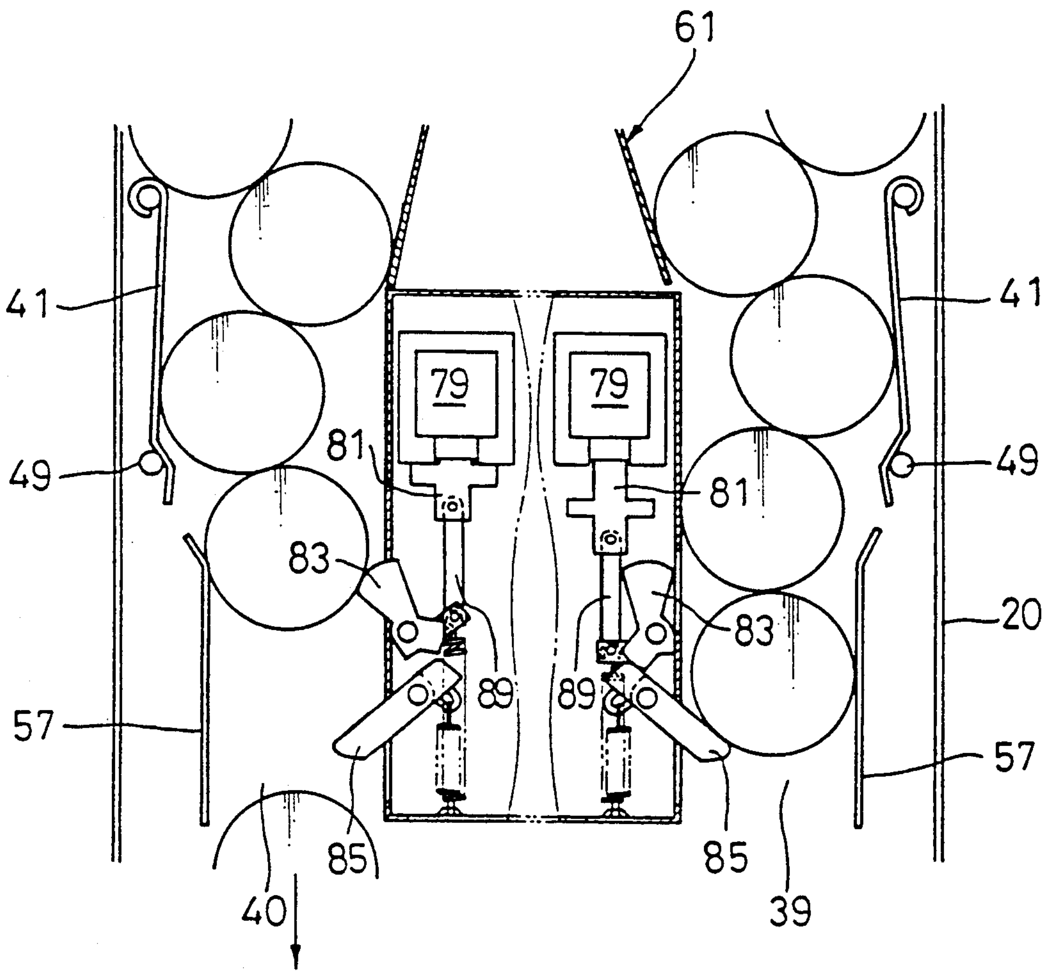
Figure 35:
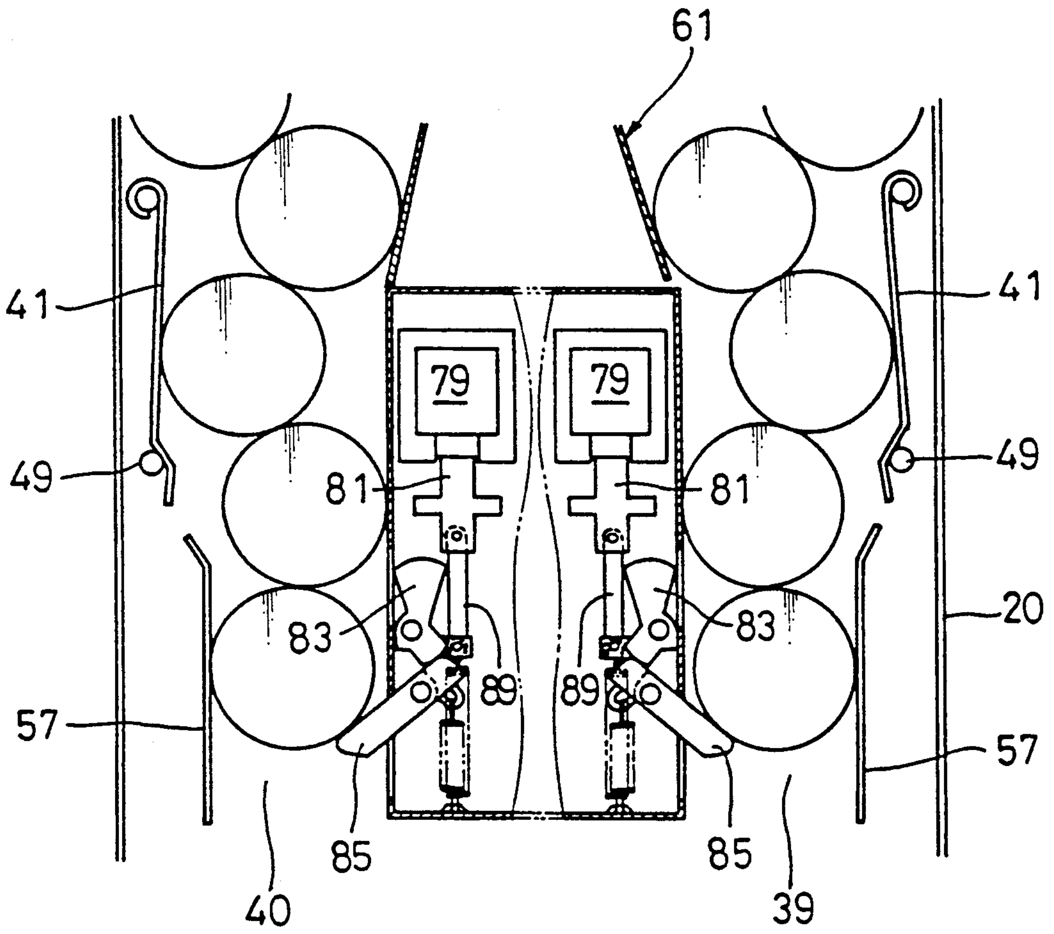
Figure 36:
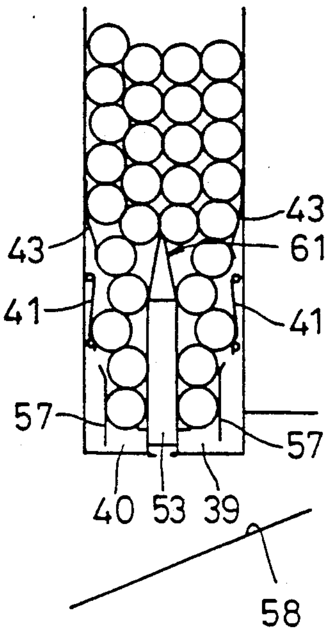
FIGS. 36 to 41 are views explaining an occurrence of bridging and a cancellation of the same in the case of thin cans.
Figure 37:
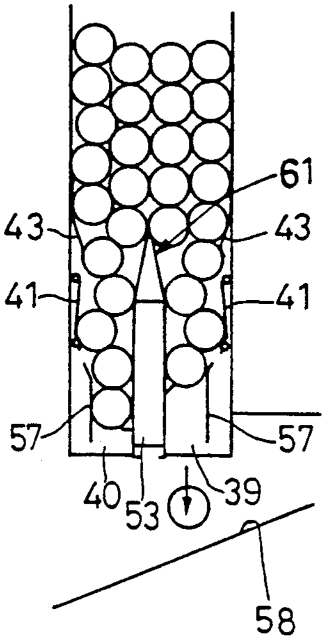

FIG. 27 shows the feed mechanisms 59 of the feed unit 53 for feeding commodities one by one out of the first and second discharge paths 39 and 40. Since the left and right feed mechanisms 59 have the same arrangement and function, only the right feed mechanism 59 will be explained.

The feed mechanism 59 comprises a solenoid 79 to be turned ON and OFF, a plunger 81 movable in and out of the solenoid 79 in response to ON and OFF actions of the solenoid 79, a first stopper 83 movable in response to the plunger 81 between an active position indicated with a dotted line and a standby position indicated with a continuous line, and a second stopper 85 movable between an active position indicated with a continuous line and an inactive position is indicated with a dotted line.

When a coin is inserted into the coin inlet (not shown) of the main door 3 and when one of the commodity selection buttons 11 is pushed, the solenoid 79 is turned ON. The right and left solenoids 79 are alternately turned ON in response to activation signals. When the solenoid 79 is turned ON, the plunger 81 is attracted in a direction indicated with an arrow mark. The solenoid 79 is turned OFF after a predetermined time, and the plunger 81 is then pulled back to an original position by a return spring 87. An en of the return spring 87 is connected to the bottom of the feed unit 53 while the other end thereof is connected to a connection rod 89, which is connected to the plunger 81 through a pin P.

The first stopper 83 is swingable around a stopper shaft 83*a* between the active position and the standby position and connected to the connection rod 89 through a pin Pl. The first stopper 83 is at the standby position when the solenoid 79 is in an OFF state, and switched to the active position when the solenoid 79 is turned ON.

The second stopper 85 is swingable around a stopper shaft 85*a* and usually forced to the active position by a spring 91. A base 85b of the second stopper 85 is in contact with a base 83b of the first stopper 83 at the standby position, thereby restricting a clockwise movement of the second stopper 85.

FIGS. 28 through 35 show operations of the feed mechanism 59. A commodity on the second stopper 85 is held at the position without dropping. When the first stopper 83 is switched to the active position, the first stopper 83 helds upper commodities, and the second stopper 85 is moved to the inactive position due to the weight of the commodity. A repetition of these motions feed the commodities one by one.

Figure 49:
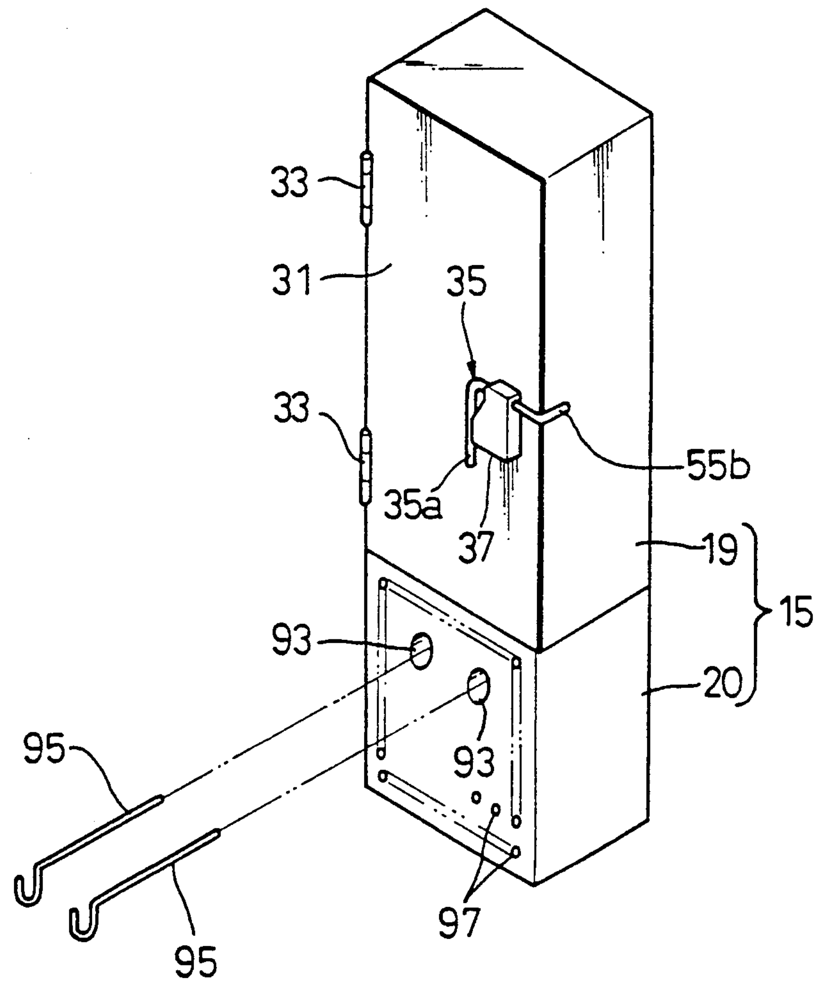
FIG. 49 is a perspective view showing the storage rack with holes into which bridging pins for forcibly bridging commodities are inserted.
Figure 50:
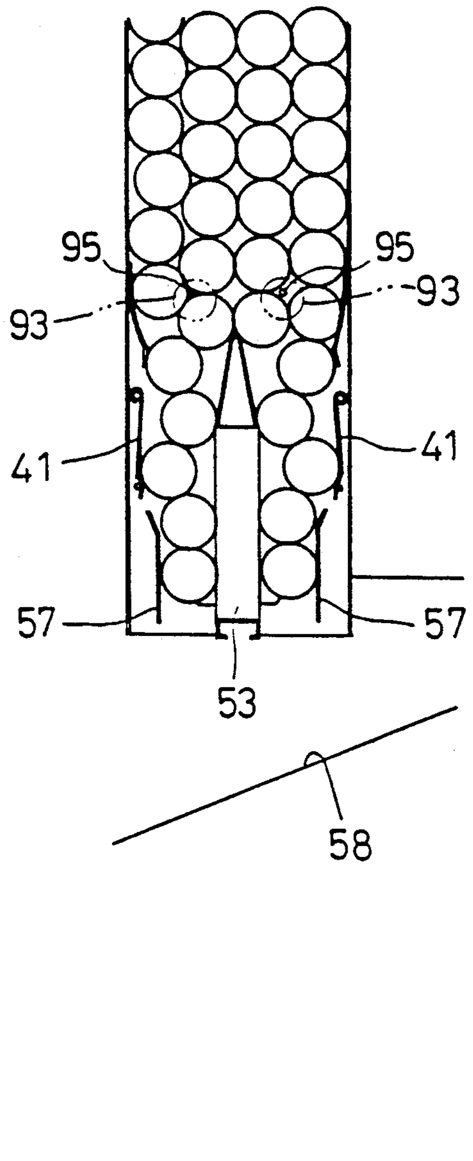
FIGS. 50 to 53 are views explaining an occurrence of forcible bridging and a discharge of commodities.
Figure 51:
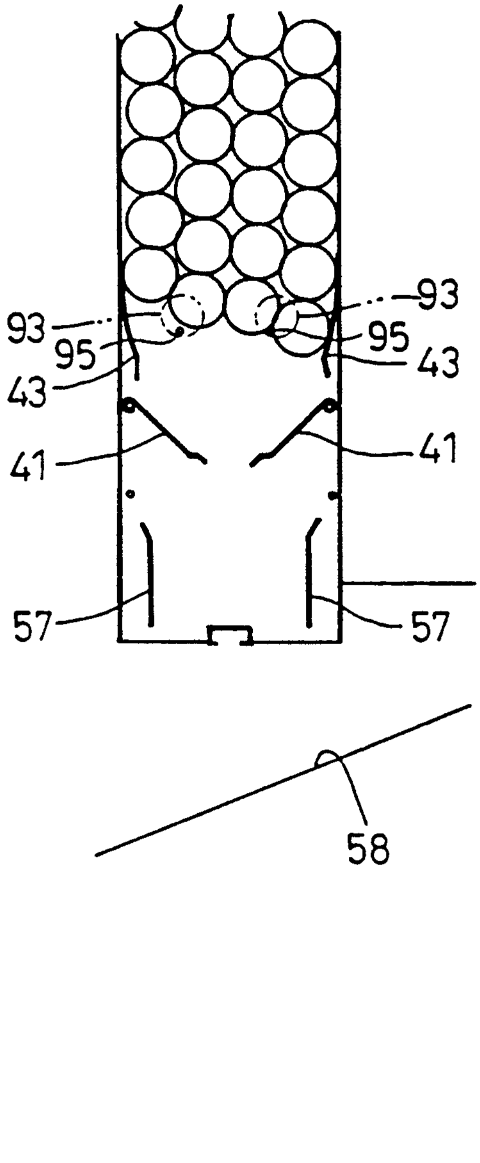
Figure 52:
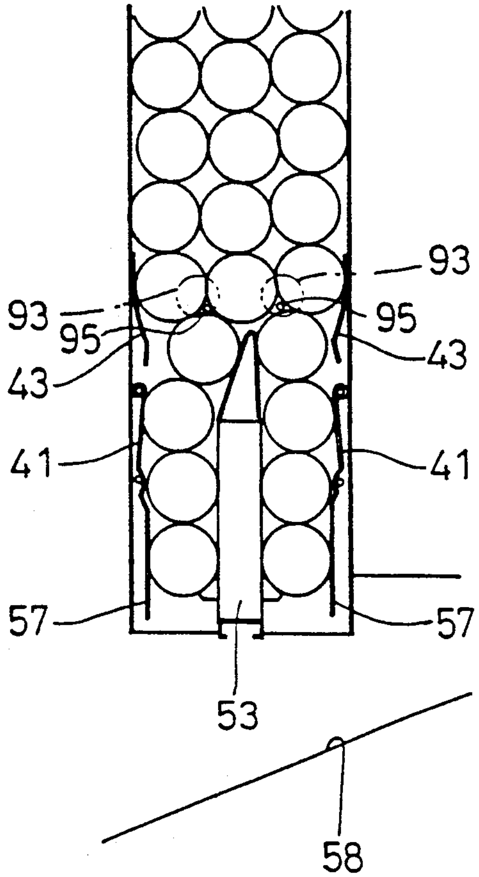
Figure 53:
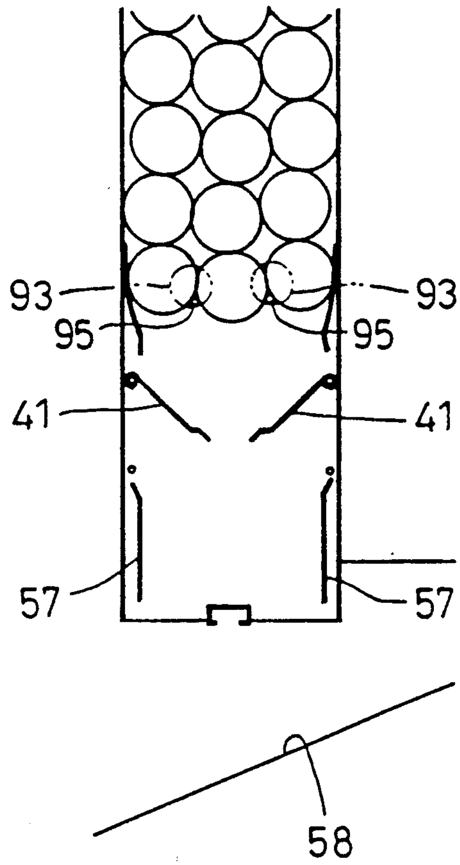

If any one of the feed mechanisms 59 fails, the feed unit 53 may be replaced with new one. To replace the feed unit 53, commodities remaining inside the storage rack 15 are taken out if the quantity of the remaining commodities is small, and the feed unit 53 is removed. If the storage rack 15 is filled with many commodities, bridging pins 95 are inserted into window holes 93 formed on the peripheral wall of the discharge portion 20, as shown in FIG. 49, to forcibly form a bridge of commodities as shown in FIGS. 50 through 53. Thereafter, commodities under the bridge are removed. In this case, vent holes 97 formed on the peripheral wall of the discharge portion 20 may substitute for the window holes 93 into which the bridging pins 95 are inserted.

Figure 54:
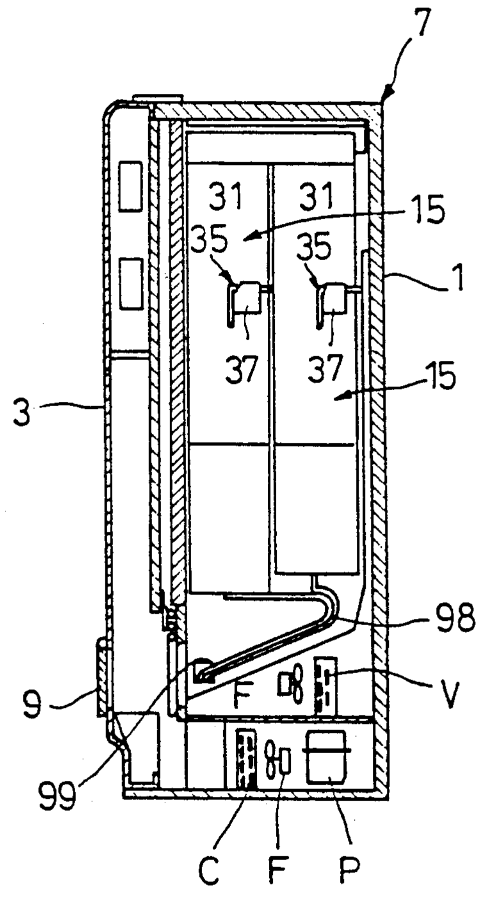
FIGS. 54 and 55 are views explaining movements of cables with the storage rack being at stored and pulled out positions.
Figure 55:
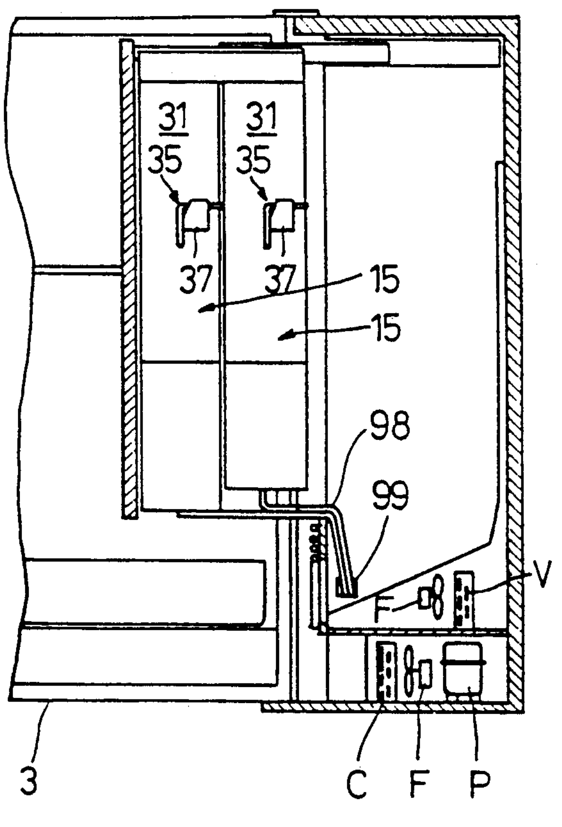

In FIGS. 54 and 55, numeral 98 denotes a signal cable. A cable outlet 99 is arranged at a front part of the vending machine 7 so that the signal cable 98 is not subjected to an excessive force when the storage rack 15 is pulled out.

Returning to FIG. 17, numeral 99 denotes a commodity detecting sensor, which is usually pushed by commodities into an OFF state. When there is no commodity, the sensor 99 protrudes into a corresponding one of the first and second discharge paths 39 and 40 into an ON state. Then, an indication of "SOLD OUT" is lighted ON on the display portion (not shown) on the main door 3.

Figure 56:
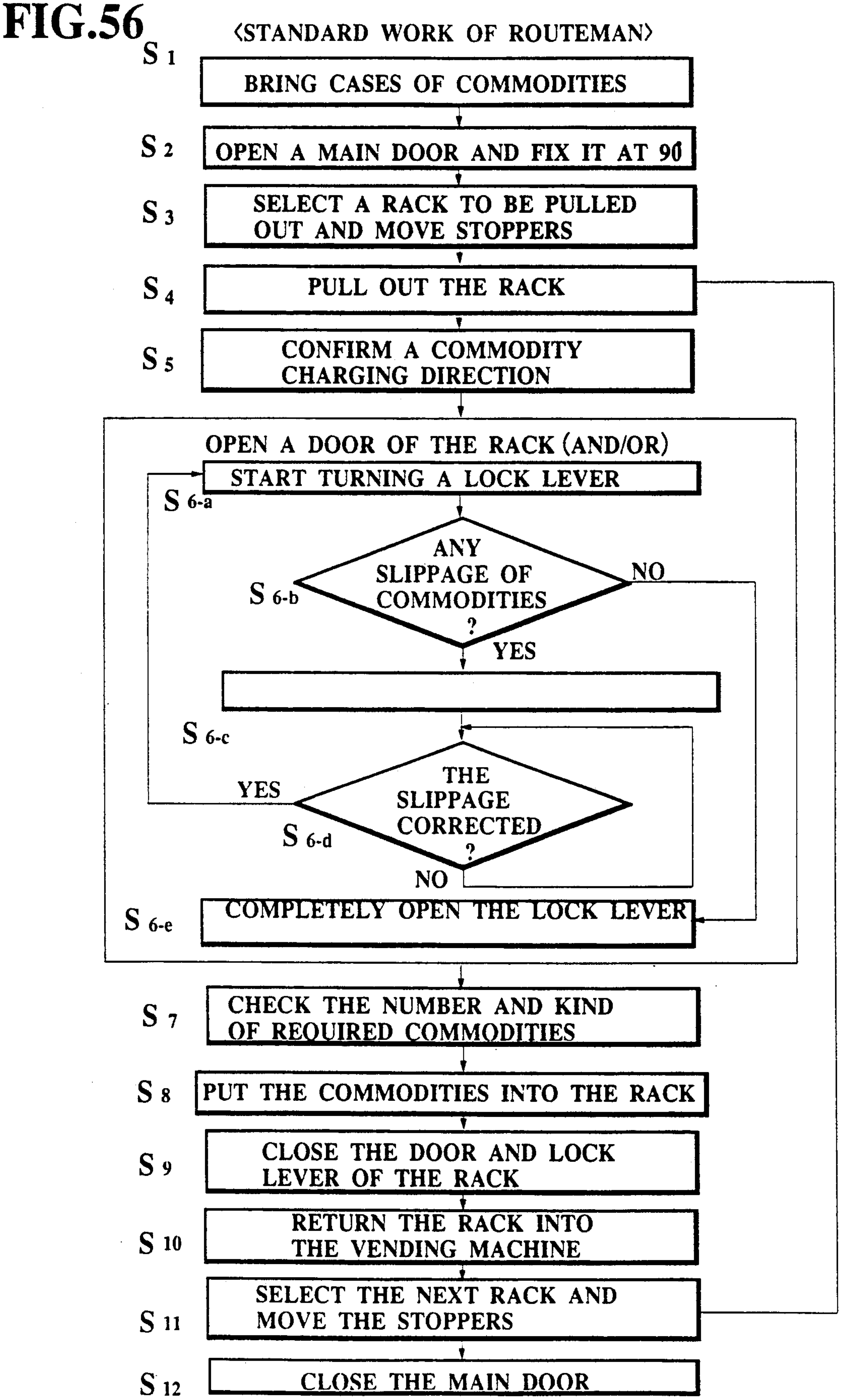
FIG. 56 is a flowchart showing standard work of a routeman (a maintenance man)

Standard work of a routeman (a maintenance man) will be explained with reference to a flowchart of FIG. 56.

In a step S1, commodities are brought to the vending machine 7. In a step S2, the main door 3 is opened for about 90° degrees. In a step S3, the stoppers 21 are moved, and one of the storage racks 15 is selected. In a step S4, the selected storage rack 15 is pulled out. The orientation of the door 31, i.e., a commodity charging direction is confirmed in s step S5.

In a step S6, the door 31 is opened. To do so, the lock lever 35 is turned in a step S6-a. At this time, in a step S6-b, it is confirmed from deformations of the casing 29 whether or not commodities in the storage rack 15 are not slipped forward due to vibration caused when the storage rack 15 has been pulled out. If the commodities seem to have been slipped, it is stopped to turn the lock lever 35 in a step S6-c. If there is no slippage of the commodities, the lock lever 35 is turned and the door 31 is opened in a step S6-e.

When the commodities seem to have been slipped, the lock lever 35 is stopped, and the casing 29 is pushed or hit to correct the slippage in the step S6-d. After the slippage is corrected, the steps S6-a to S6-e are carried out to open the lock lever 35 and door 31.

The routeman then checks the number and kind of commodities to be stored in the opened casing 29 and replenishes the casing 29 with the commodities in a step S8. The door 31 is then closed and locked with the lock lever 35 in a step S9. The storage rack 15 is returned into the vending machine 7 in a step S10, and the next storage rack 15 to be pulled out is selected in a step S11. The flow then returns to the step S4, and the above processes are repeated. After the work is completed, the main door 3 is closed in a step S12.

Figure 57:
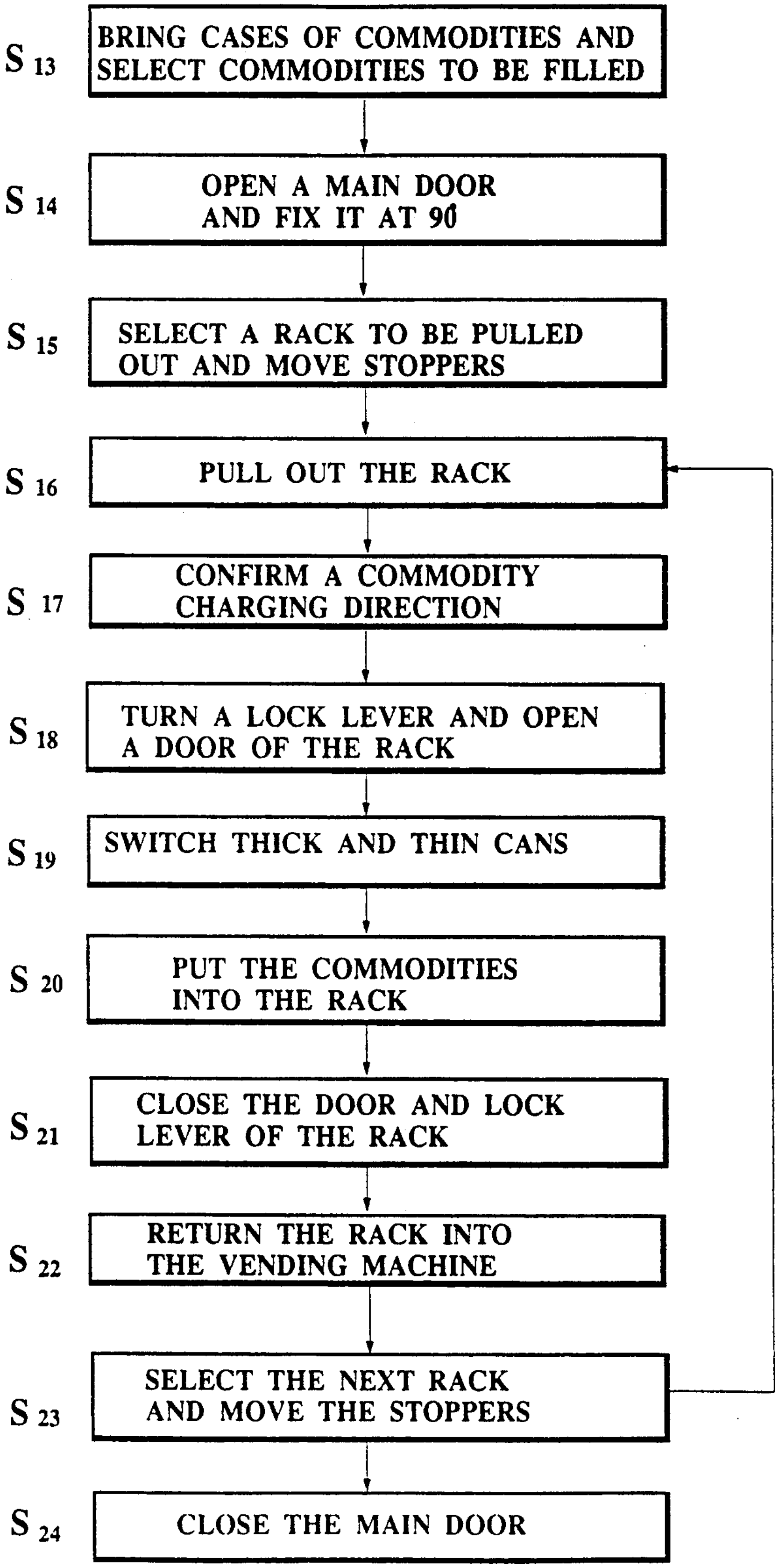
FIG. 57 is a flowchart showing switching work of thick and thin cans, for newly installing the vending machine.

FIG. 57 is a flowchart showing switching work of thick and thin cans, to be carried out when the vending machine 7 is newly installed.

In a step S13, cases of commodities are brought to the vending machine 7. The main door 3 is opened in a step S14, and the stoppers 21 are slid to select one of the storage racks 15 in a step S15. The selected storage rack 15 is pulled out in a step S16. The position of the door 31 of the storage rack 15 pulled out, i.e., a commodity charging direction is confirmed in a step S17, and the door 31 is opened in a step S18.

In a step S19, the positioning pin 71 is inserted into the first hole 73 to use the first and second discharge paths 39 and 40 for thin cans. Alternatively, the positioning pin 71 may be inserted into the second hole 74 to use the first and second discharge paths 39 and 40 for thick cans. After the positioning pin 71 is set as required, the casing 29 is filled with commodities in a step S20. In a step S21, the door 31 is closed, and the lock lever 35 is brought to a locked position to prevent a deformation of the casing 29.

The storage rack 15 is returned into the vending machine 7 in a step S22. The next storage rack 15 to be pulled out is selected in a step S23, and the flow returns to the step S16. The above steps are repeated to complete the work, and then the main door 3 is closed in a step S24 to finish the work.

Figure 58A:
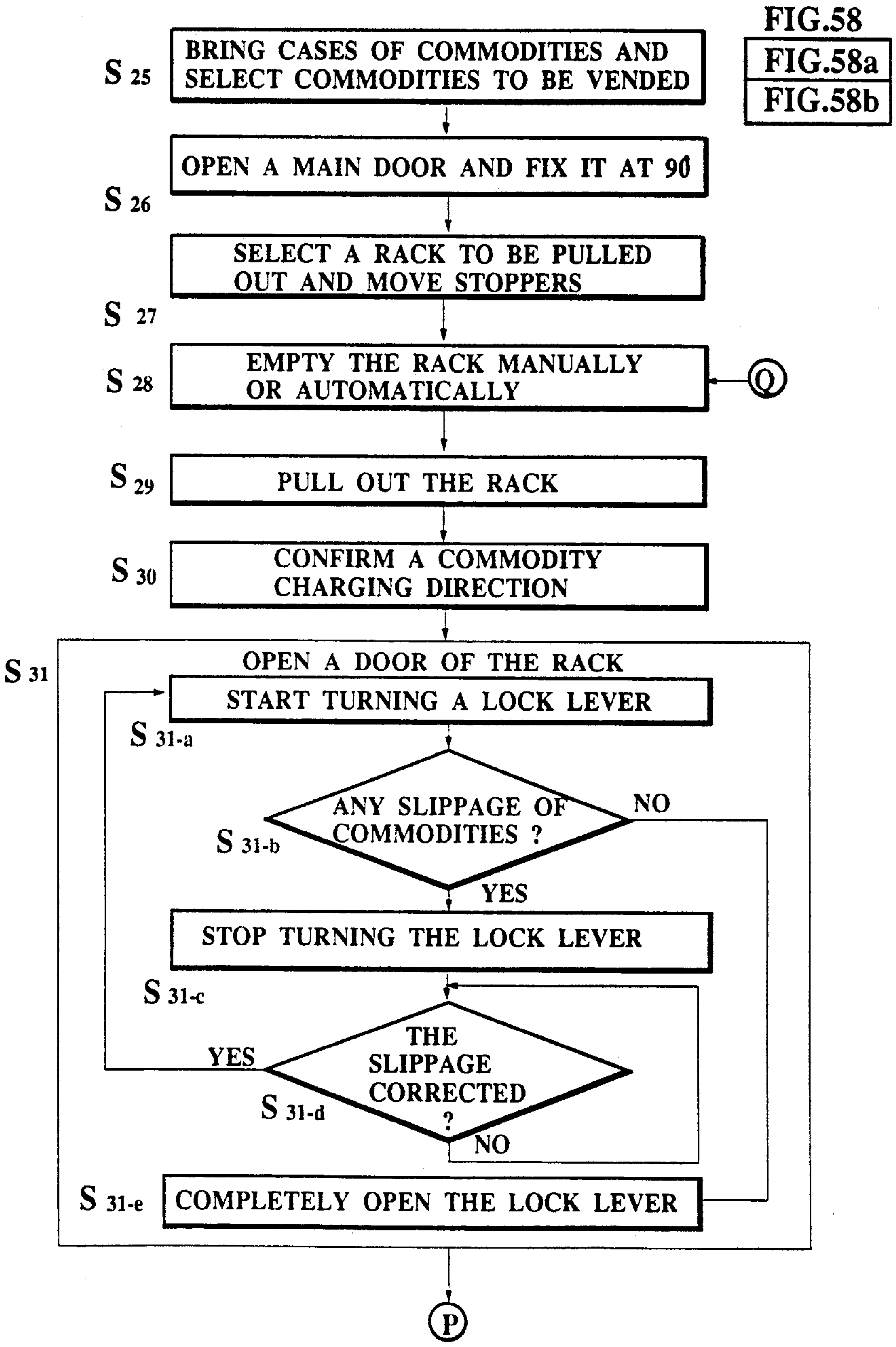
FIGS. 58*a* and 58*b* taken together show a flowchart for switching work of thick and thin cans, for changing commodities.
Figure 58B:
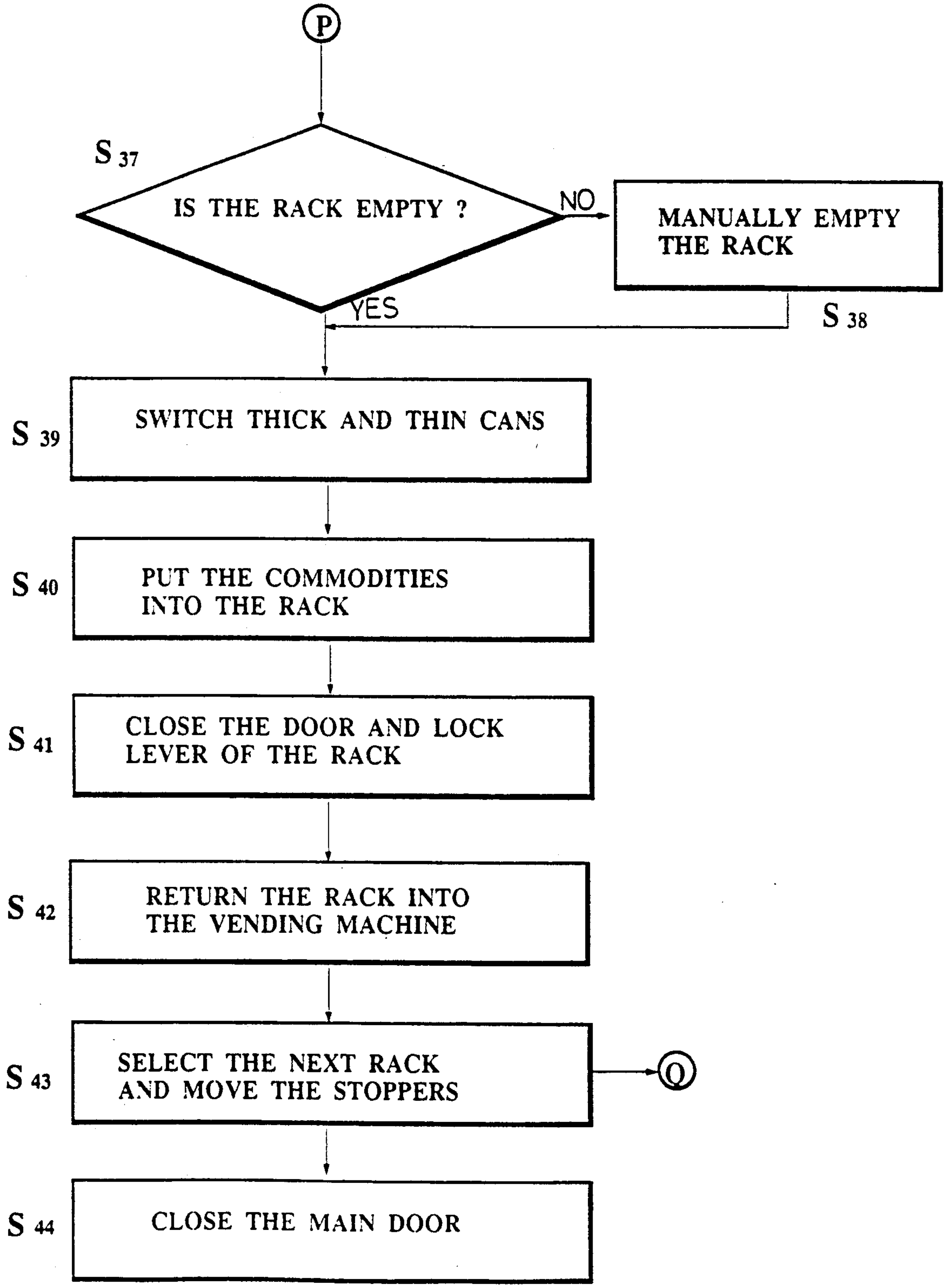

FIG. 58 is a flowchart showing work of switching thick and thin cans from one to another when changing commodities.

In a step S25, cases of commodities are brought to the vending machine 7. The main door 3 is opened in a step S26, and in a step S27, the stoppers 21 are slid to select one of the storage racks 15 to be pulled out. In a step S28, commodities are removed out of the storage rack 15 through the first and second discharge paths 39 and 40, and the storage rack 15 is pulled out in a step S29. The location of the door 31 of the storage rack 15 pulled out, i.e., a commodity charging direction is confirmed in a step S30.

In a step S31, the door 31 is opened. At first, the lock lever 35 is turned in s step S31-a. At this time, if the commodities are not completely discharged due to bridging, etc., it is confirmed, in a step S31-b, according to a deformation of the casing 29, whether or not the commodities in the casing 15 have been slipped due to vibration caused when the storage rack 15 has been pulled out. If the slippage is observed, turning the lock lever 35 is topped in a step S31-c. If there is no slippage, the lock lever 35 is turned and the door 31 is opened in a step S31-e.

If the slippage is observed, the lock lever 35 is stopped, and the casing 29 is pushed or hit in a step S31-d to correct the slippage so that the commodities may be safely removed. After the slippage is corrected, the steps S31-a to S31-e are carried out to turn the lock lever 35 and open the door 31.

Thereafter, it is confirmed whether or not the casing 29 is empty in a step S37. If there remain commodities, they are manually removed in a step S38.

After the casing 29 is emptied, the positioning pin 71 is inserted in a step S39 into the first hole 73 to use the first and second discharge paths 39 and 40 for thin cans. Alternatively, the positioning pin 71 may be inserted into the second hole 74 to use the first and second discharge paths 39 and 40 for thick cans.

Thereafter, the storage rack 15 is filled with commodities in a step S40, and in a step S41, the door 31 is closed and the clock lever 35 is locked to prevent a deformation of the casing 29. The storage rack 15 is then returned into the vending machine 7 in a step S42. The next storage rack 15 to be pulled out is selected in a step S43. The flow then returns to the step S28, and the above operations are repeated. After the completion of the work, the main door 3 is closed in a step S44.

Figures 59, 59A:
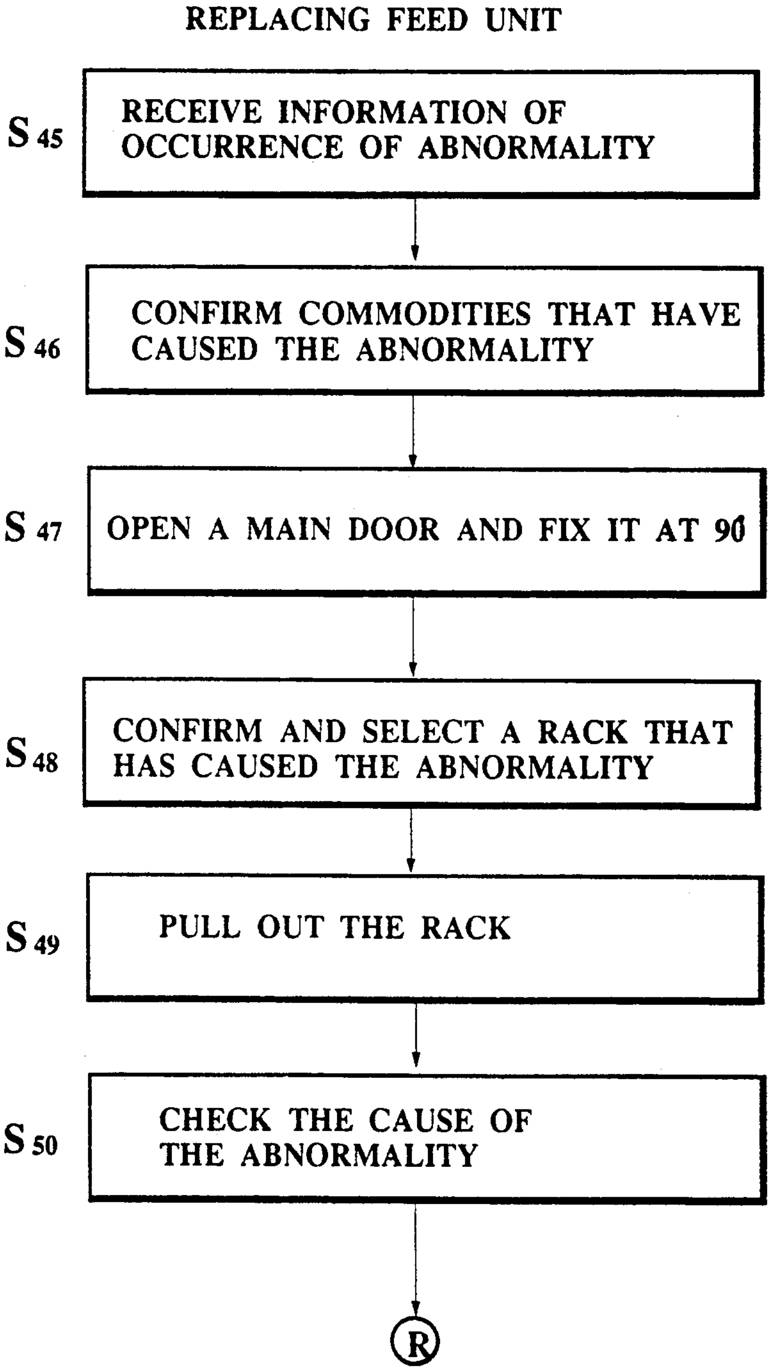
FIGS. 59*a* and 59*b* taken together show a flowchart for replacing work of the feed mechanism.
Figure 59B:
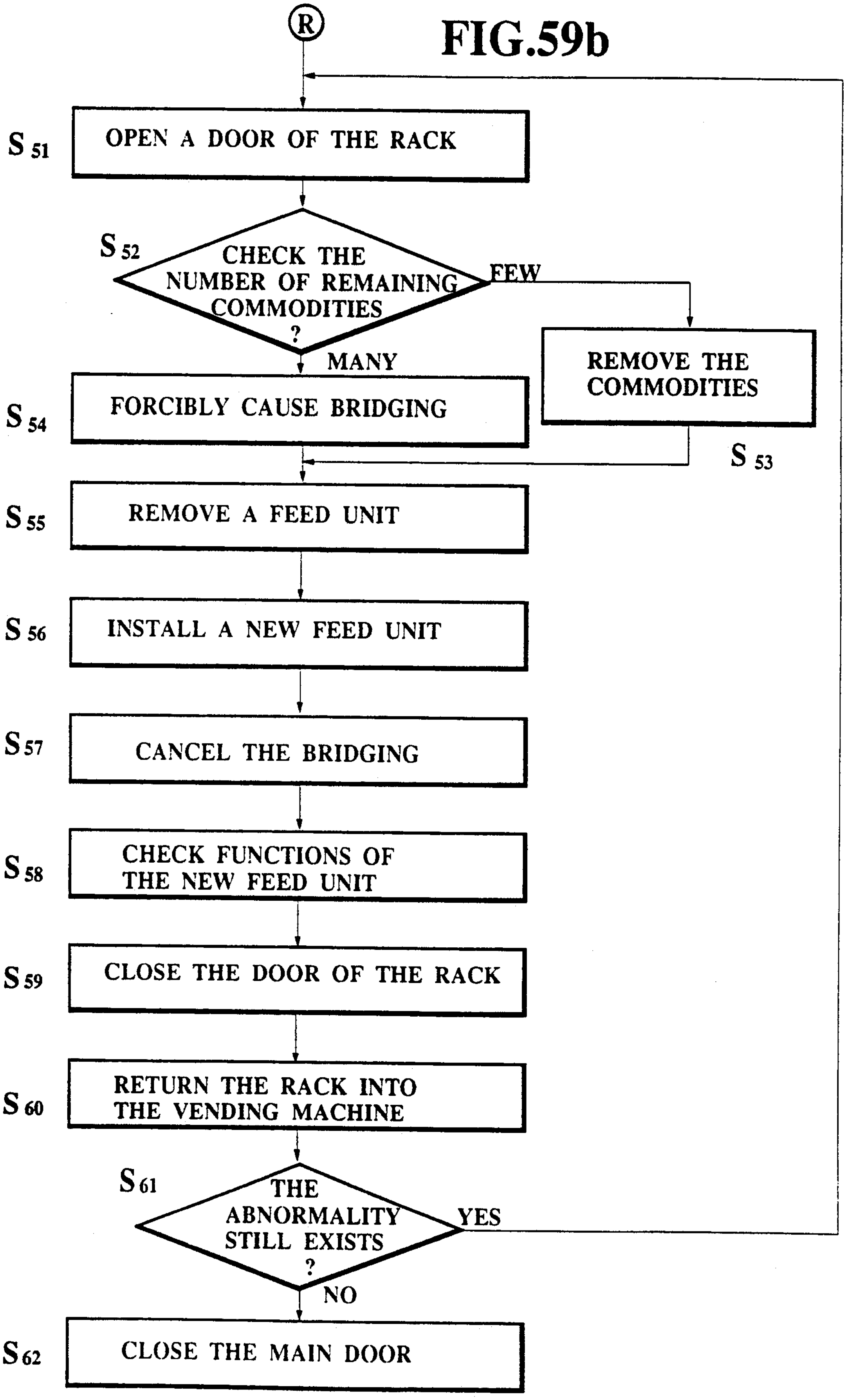

FIG. 59 is a flowchart showing work of replacing the feed unit 53.

After receiving information of occurrence of an abnormality, a routeman goes to the site and checks the location of the abnormality in steps S45 and S46. The main door 3 is opened for 90° degrees in a step S47, and an abnormal rack is checked and selected in a step S48. The abnormal one of the storage rack 15 is pulled out in a step S49, and a cause of the abnormality of the storage rack 15 pulled out is checked in a step S50. After finding the cause of the abnormality, the door 31 of the storage rack 15 is opened in a step S51, and the number of commodities remaining in the storage rack 15 is confirmed in a step S52.

If there are only a small number of commodities left in the storage rack 15, the commodities are removed in a step S53. If there are many commodities left in the storage rack 15, the bridging pins 95 are inserted into the window holes 93 to forcibly bridging the commodities in a step S54. Commodities below the bridging are removed, and the feed unit 53 is removed in a step S55. A new feed unit 53 is then installed in a step S56. Thereafter, the bridging pins 95 are pulled out to cancel the bridging in a step S57. Functions of feed mechanisms 59 of the new feed unit 53 are checked in a step S58, and the door 31 is closed in a step S59. The storage rack 15 is then returned into the vending machine 7 in a step S60. It is checked whether or not the other storage racks 15 are sound in a step S61. If they are sound, the main door 3 is closed in a step S62 to complete the work. If another storage rack 15 is found to be abnormal, the step S49 and the following steps are repeated.

To purchase a commodity with the automatic vending machine 7, one firstly inserts a coin into the coin inlet then pushes one of the commodity selection buttons 11. In response to this, the feed mechanism 59 is activated to feed a commodity. As shown in FIGS. 28 through 35, the left and right feed mechanisms 59 are alternately activated to feed the commodities one by one in response to a signal generated according to each operation of pushing one of the commodity selection buttons 11.

Figure 38:
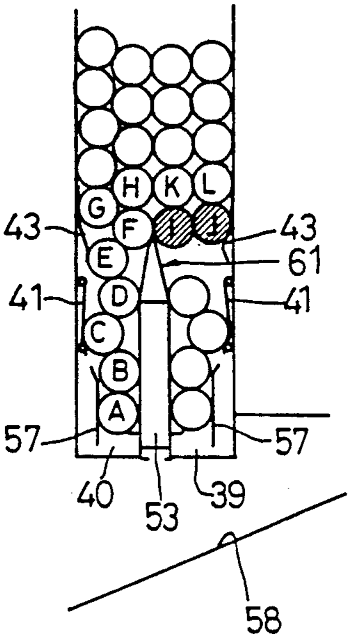
Figure 39:
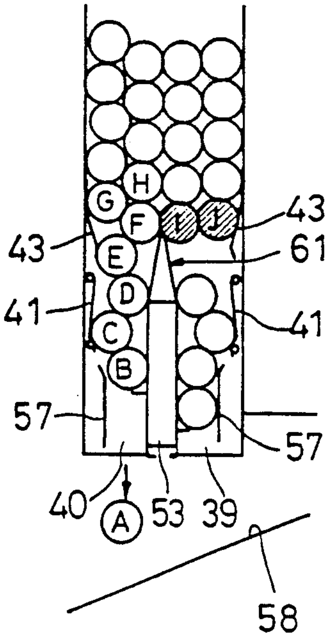
Figure 40:
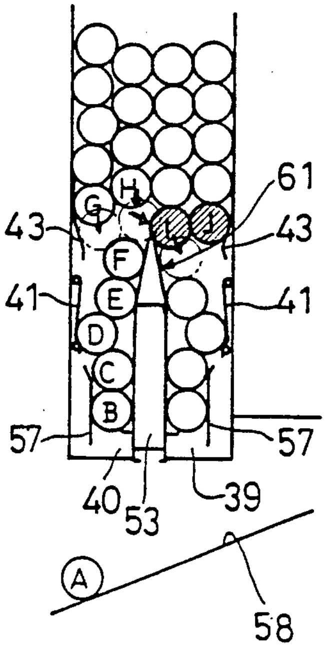
Figure 41:
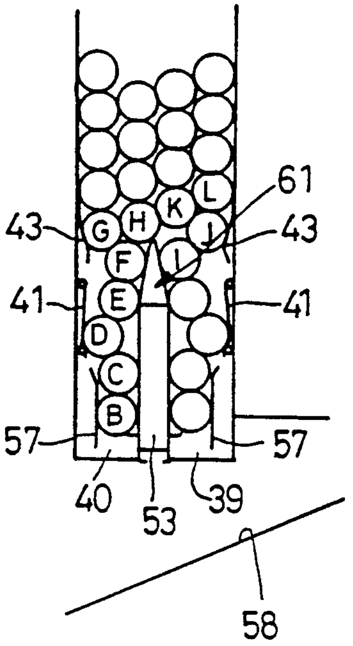
Figure 42:
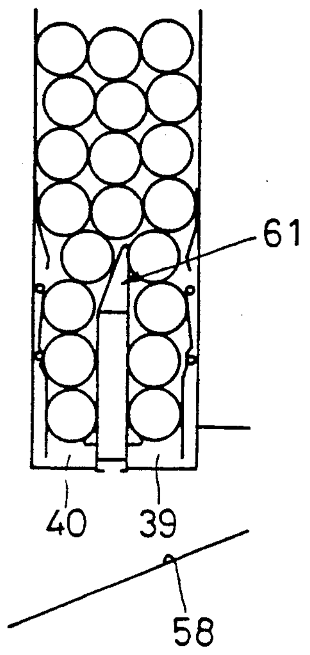
FIGS. 42 to 48 are vies explaining an occurrence of bridging and a cancellation of the same in the case of thick cans.
Figure 43:
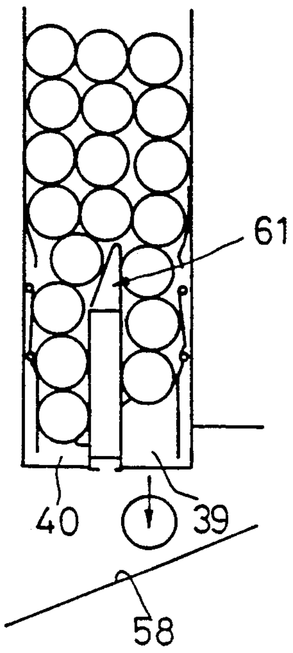
Figure 44:
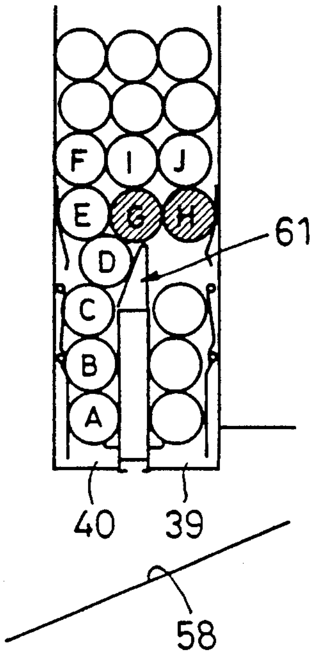
Figure 45:
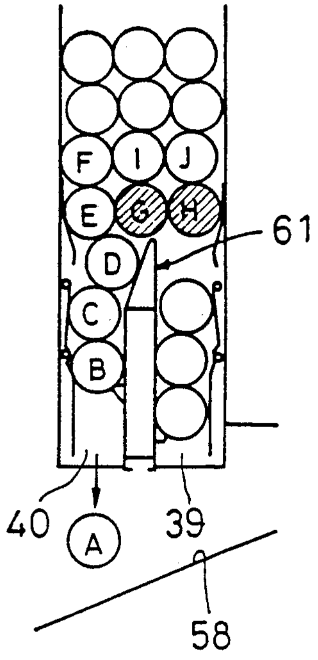
Figure 46:
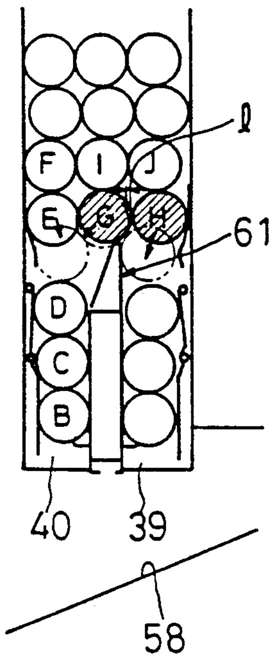
Figure 47:
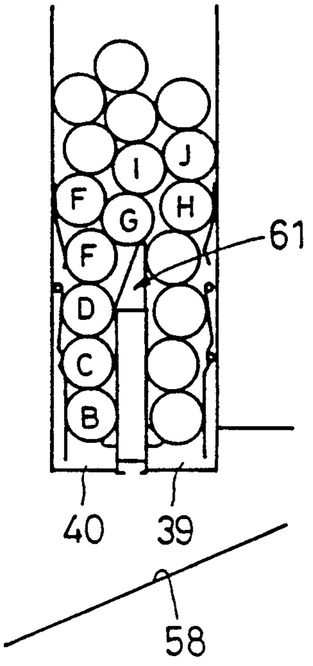
Figure 48:
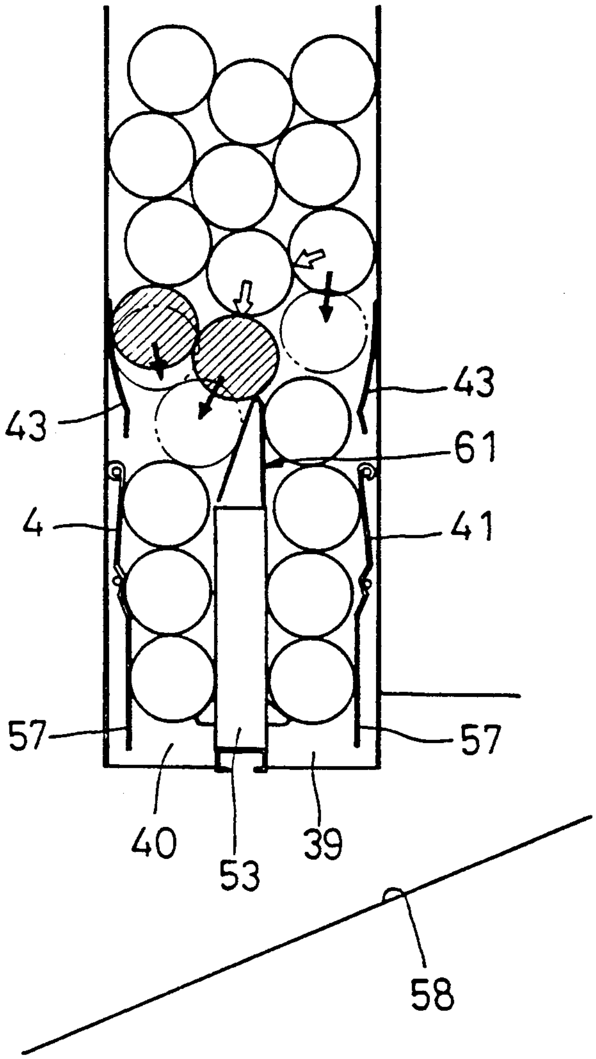

Even if bridging occurs as shown in FIG. 38 due to a balanced force at a branching point with commodities I and J above the first discharge path 39 and commodities E, F and G above the second discharge path 40, a commodity A is fed according to the next signal as shown in FIG. 39, and the commodity E drops are shown in FIG. 40 to cancel a supporting force acting above the second discharge path 40. Then, with load from the above, the commodities I and J above the first discharge path 39 drop to cancel the bridging as shown in FIG. 41, This fact is also applicable for thick cans shown in FIGS. 42 through 47. If bridging occurs at the branching point with commodities G, H and E, a commodity A is fed in response to the next signal, so that commodities B, C, D and E drop. Since the commodity E that has been providing a supporting force drops, the bridging naturally disappears due to a load from the above.

Figure 19:
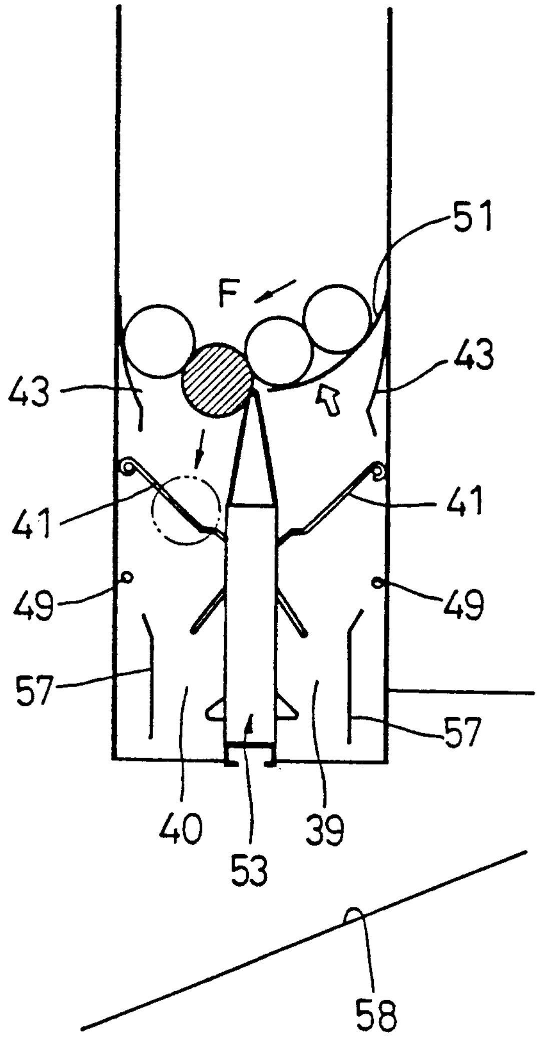
FIG. 19 is a view explaining a pusher of the discharge portion.
Figure 20:
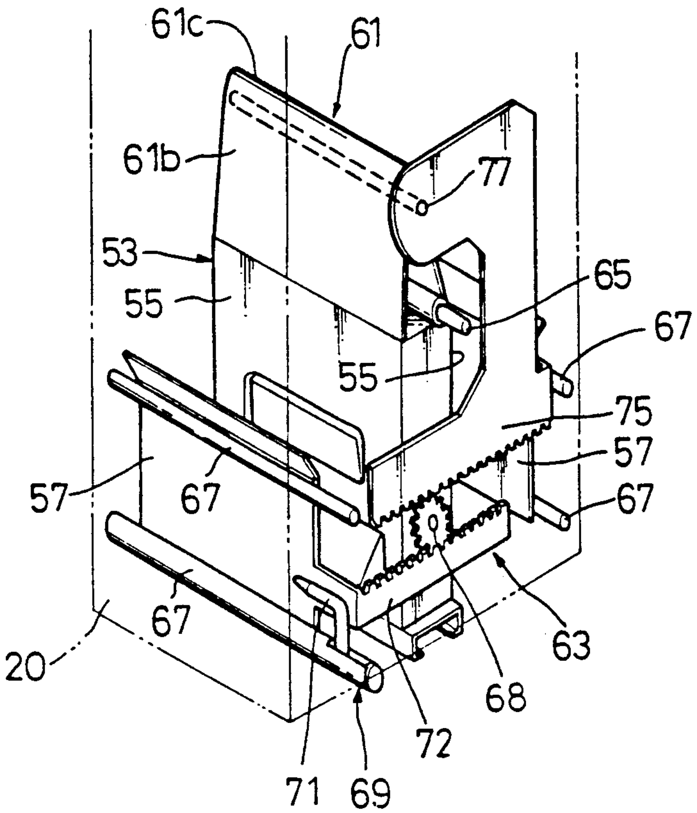
FIG. 20 is a perspective view showing an interlock mechanism for interlocking a guide member with guide plates.
Figure 21:
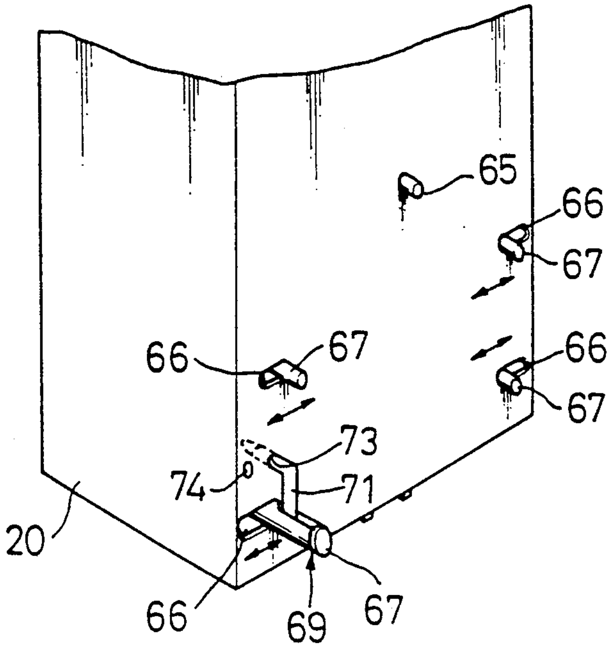
FIG. 21 is a perspective view showing the back of the discharge portion having a guide plate operation portion.
Figure 22:
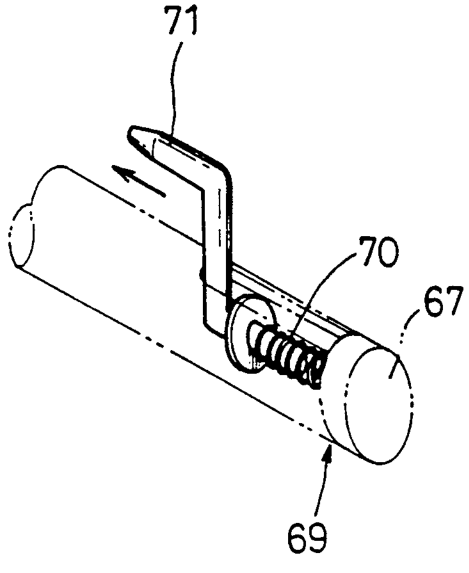
FIG. 22 is a perspective view showing a positioning pin disposed at the guide plate operation portion.

For the last row of commodities, the subpusher 51 shown in FIG. 19 applies a force F to the second commodity from the left to cause an imbalance so that no bridging occurs.

In summary, the automatic vending machine according to the present invention provides the following effects:

(1) Each storage portion 19 has a large capacity of storing commodities and thus reduces the number of replenishment operations to be done.

(2) The first and second discharge paths 39 and 40 alternately discharge commodities, thereby preventing a clog of the commodities due to bridging.

(3) The guide member 61 smoothly guides a plurality of lines of commodities stocked in the storage portions 19 into the first and second discharge paths 39 and 40.

(4) The guide plates 57 are moved forward or backward to easily change the guide member 61 and first and second discharge paths 39 and 40 for thin and thick cans.

(5) The subpusher 51 surely discharges the last row of commodities without causing bridging.

Various modifications will become possible for those skilled in the art after receiving the teachings of the present disclosure without departing from the scope thereof.

What is claimed is:

1. An automatic vending machine for automatically vending commodities, comprising:

(a) at least one storage means for storing the commodities;

(b) at least two discharge paths downwardly branched from said storage means, for discharging the commodities;

(c) feed means for opening and closing two discharge paths alternately for feeding the commodities one by one from said storage means; and (d) a guide member having an angular cross section, for guiding the commodities into said discharge paths.

2. The automatic vending machine according to claim 1, wherein a top portion of the guide member is shiftable according to the size of the commodities.

3. The automatic vending machine according to claim 2, wherein each of said discharge paths involves a pusher member having a lower free end for guiding the commodities toward the center of a corresponding one of said discharge paths, and wherein at least one of the pusher members is provided with a subpusher member on the inner side of said discharge path, a spring force of the subpusher member being weaker than that of the pusher member, a free end of the subpusher member extending toward said discharge path.

4. The automatic vending machine according to claim 3, wherein the guide plates facing the guide faces of the feed unit and forming said discharge paths are supported to be movable toward and away from the guide faces according to the diameters of thin and thick cans, the guide plates are interlocked with the guide member through an interlock mechanism so that the top of the guide member is shifted from a neutral position to one of said discharge paths in response to movements of the guide plates.

* * * * *